United States Patent
Sim et al.

(10) Patent No.: US 12,495,232 B2
(45) Date of Patent: Dec. 9, 2025

(54) ELECTRONIC DEVICE COMPRISING ACOUSTIC COMPONENT

(71) Applicant: Samsung Electronics Co., Ltd., Suwon-si (KR)

(72) Inventors: Myoungsung Sim, Suwon-si (KR); Hunki Lee, Suwon-si (KR); Woojin Cho, Suwon-si (KR); Kiwon Kim, Suwon-si (KR); Choonghyo Park, Suwon-si (KR); Seongkwan Yang, Suwon-si (KR); Byounghee Lee, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 18/435,327

(22) Filed: Feb. 7, 2024

(65) Prior Publication Data

US 2024/0244359 A1 Jul. 18, 2024

Related U.S. Application Data

(63) Continuation of application No. PCT/KR2022/008510, filed on Jun. 16, 2022.

(30) Foreign Application Priority Data

Aug. 10, 2021 (KR) .......................... 10-2021-0105437

(51) Int. Cl.
*H04R 1/02* (2006.01)
*H04N 23/51* (2023.01)

(52) U.S. Cl.
CPC ............ *H04R 1/025* (2013.01); *H04R 1/028* (2013.01); *H04N 23/51* (2023.01); *H04R 2201/029* (2013.01); *H04R 2499/11* (2013.01)

(58) Field of Classification Search
CPC .. H04R 1/025; H04R 1/028; H04R 2201/029; H04R 2499/11; H04R 2430/01;
(Continued)

(56) References Cited

U.S. PATENT DOCUMENTS 8,180,411 B2 5/2012 Skagmo et al.
9,485,337 B2 11/2016 Kaneda
(Continued)

FOREIGN PATENT DOCUMENTS

JP 2012-195835 A 10/2012
JP 2020-053922 A 4/2020
(Continued)

OTHER PUBLICATIONS

European Search Report dated Oct. 16, 2024, issued in European Application No. 22855997.7.
(Continued)

*Primary Examiner* — Jason Chan
(74) *Attorney, Agent, or Firm* — Jefferson IP Law, LLP

(57) ABSTRACT

An electronic device is provided. The electronic device includes a housing, a camera perpendicular to a first edge of the electronic device, disposed inside the housing, a speaker disposed on one side of the camera inside the housing, a receiver disposed on another side of the camera inside the housing, and a structure disposed between the first edge and the camera inside the housing. The housing includes a first opening formed on the front surface, and a plurality of second openings formed on a side surface. The structure may shield some of the plurality of second openings such that a first sound output from the speaker is output to other second openings or at least one of the first openings, and a second sound output from the receiver is output to the first opening.

18 Claims, 17 Drawing Sheets

(58) Field of Classification Search
CPC ........ H04R 5/02; H04R 1/2849; H04N 23/51; H04M 1/0264; H04M 1/035; G06F 1/1616; G06F 1/1686; G06F 1/1688
See application file for complete search history.

(56) References Cited

U.S. PATENT DOCUMENTS

| | | | |
|---|---|---|---|
| 9,857,829 | B2 | 1/2018 | Yukawa et al. |
| 9,866,662 | B2 | 1/2018 | Lee et al. |
| 10,129,378 | B2 | 11/2018 | Nonaka et al. |
| 10,827,054 | B2 | 11/2020 | Cha et al. |
| 11,109,128 | B2 | 8/2021 | Behles et al. |
| 11,159,891 | B2 | 10/2021 | Kim et al. |
| 11,483,637 | B2 | 10/2022 | Moon et al. |
| 11,540,046 | B2 * | 12/2022 | Song ............... H04M 1/035 |
| 2005/0217926 | A1 | 10/2005 | Murata |
| 2012/0321120 | A1 | 12/2012 | Han et al. |
| 2014/0004913 | A1 | 1/2014 | Kimura et al. |
| 2015/0340795 | A1 * | 11/2015 | Lee ................ H04R 1/086 381/334 |
| 2019/0127217 | A1 | 5/2019 | Cargill et al. |
| 2019/0190123 | A1 | 6/2019 | Dabov |
| 2019/0320253 | A1 | 10/2019 | Park et al. |
| 2019/0349459 | A1 | 11/2019 | Cha et al. |
| 2020/0169816 | A1 | 5/2020 | Kim et al. |
| 2021/0006876 | A1 | 1/2021 | Moon et al. |
| 2022/0210548 | A1 | 6/2022 | Zheng et al. |

FOREIGN PATENT DOCUMENTS

| | | |
|---|---|---|
| KR | 10-0690767 B1 | 3/2007 |
| KR | 10-2012-0138164 A | 12/2012 |
| KR | 10-2013-0091185 A | 8/2013 |
| KR | 10-2019-0075021 A | 6/2019 |
| KR | 10-2020-0060991 A | 6/2020 |
| KR | 10-2147444 B1 | 8/2020 |
| KR | 10-2021-0003538 A | 1/2021 |
| KR | 10-2022-0111530 A | 8/2022 |

OTHER PUBLICATIONS

International Search Report dated Sep. 21, 2022, Issued in International Application No. PCT/KR2022/008510.

* cited by examiner

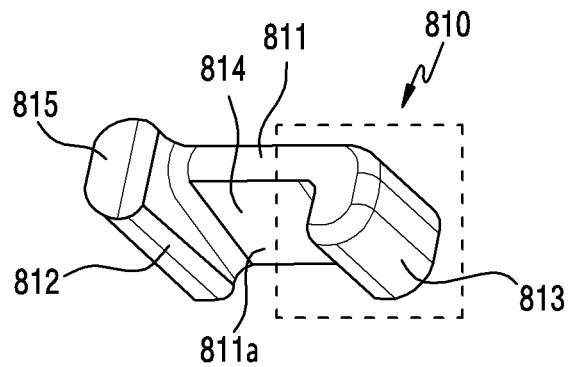
FIG.9A
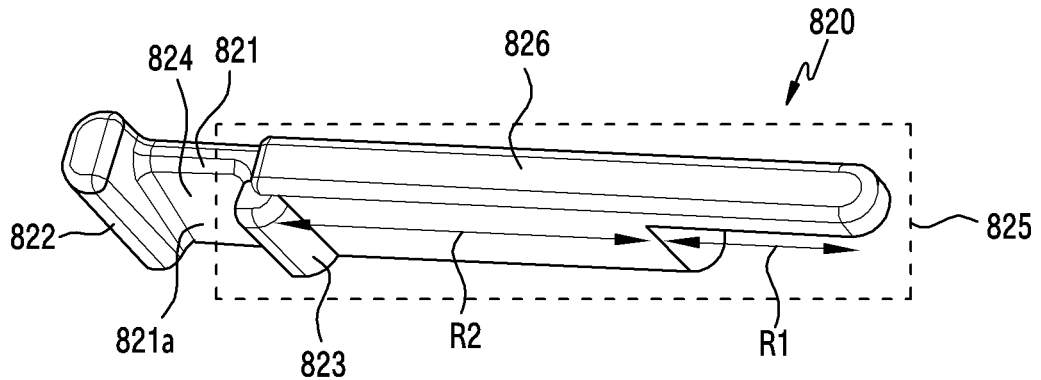
FIG.9B
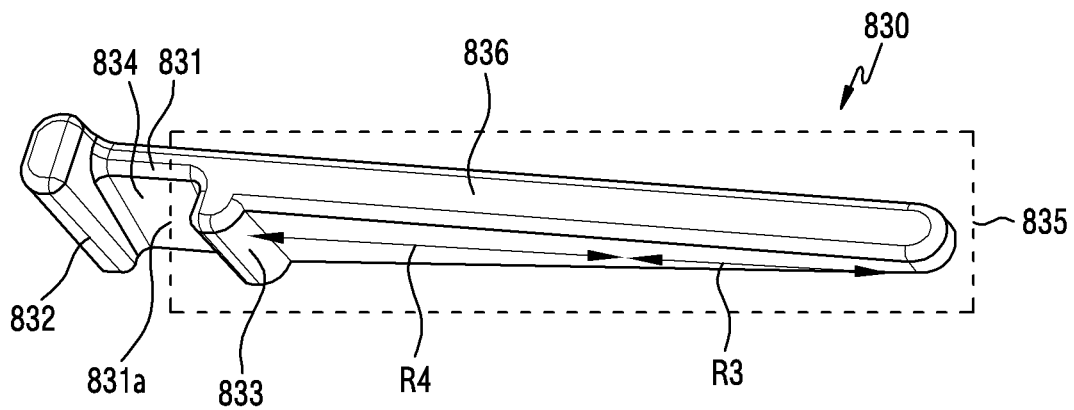
FIG.9C
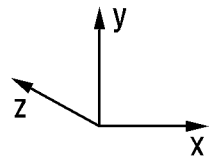

ELECTRONIC DEVICE COMPRISING ACOUSTIC COMPONENT

CROSS-REFERENCE TO RELATED APPLICATION(S)

This application is a continuation application, claiming priority under § 365(c), of an International application No. PCT/KR2022/008510, filed on Jun. 16, 2022, which is based on and claims the benefit of a Korean patent application number 10-2021-0105437, filed Aug. 10, 2021, in the Korean Intellectual Property Office, the disclosure of which is incorporated by reference herein in its entirety.

BACKGROUND

1. Field

The disclosure relates to an electronic device including an acoustic component.

2. Description of Related Art

An electronic device such as a smartphone may include various components, such as a camera, a microphone, a speaker or a receiver, disposed therein to provide various functions. An electronic device may include a front-facing camera and a rear-facing camera. When a front-facing camera is disposed at an upper end of a center of an electronic device, a speaker and a receiver may be disposed on a side surface of the front-facing camera.

An electronic device may include at least one hole to discharge a sound outputted from an acoustic component such as a speaker or a receiver to the outside of the electronic device, or to receive a voice or a sound from the outside of the electronic device. The hole may be formed on at least one of a front surface, a side surface, or a rear surface of the electronic device.

As an area through which a sound outputted from an acoustic component is emitted is closer to the center of an electronic device, acoustic performance of the electronic device may be more enhanced.

The above information is presented as background information only to assist with an understanding of the disclosure. No determination has been made, and no assertion is made, as to whether any of the above might be applicable as prior art with regard to the disclosure.

SUMMARY

When at least one hole formed in an electronic device is asymmetrical in a vertical or horizontal direction, aesthetic quality of an appearance of the electronic device may be degraded. The electronic device may include at least one additional hole to make the at least one hole symmetrical in the vertical or horizontal direction.

When an area through which a sound outputted from an acoustic component is emitted is disposed close to the center of the electronic device, the at least one additional hole and the area through which the sound outputted from the acoustic component is emitted may be connected. In this case, a sound outputted from the acoustic component may be discharged through the at least one additional hole, and to this end, acoustic performance of the electronic device may be degraded.

Aspects of the disclosure are to address at least the above-mentioned problems and/or disadvantages and to provide at least the advantages described below. Accordingly, an aspect of the disclosure is to provide an electronic device including an acoustic component.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a camera disposed inside the housing, spaced apart from a first periphery by a first length in a first direction that is perpendicular to the first periphery of the electronic device and facing a second periphery of the electronic device, a speaker disposed on one side of the camera inside the housing, a receiver disposed on another side of the camera inside the housing, and a structure disposed between the first periphery and the camera inside the housing, wherein the housing includes a first opening formed on a front surface of the electronic device between the first periphery and the camera, and a plurality of second openings formed on a side surface of the electronic device along the first periphery, wherein the structure is configured to shield at least two of the plurality of second opening, such that a first sound output from the speaker is discharged through at least one other openings of the second openings or the first opening, and a second sound output from the receiver is discharged through the first opening.

In accordance with another aspect of the disclosure, an electronic device is provided. The electronic device includes at least one additional hole to make at least one hole formed in the electronic device symmetrical to each other. Accordingly, aesthetic quality of an appearance of the electronic device may be enhanced.

In addition, according to various embodiments, an electronic device has an area disposed adjacent to a center of the electronic device to allow a sound outputted from an acoustic component to be emitted therethrough. Accordingly, acoustic performance of the electronic device may be enhanced.

In addition, according to various embodiments, an electronic device includes a shielding structure to prevent degradation of acoustic performance of the electronic device caused by at least one additional hole.

Besides these effects, various effects that are directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 9A, 9B, and 9C are perspective views illustrating shielding structures according to various embodiments of the disclosure;

Throughout the drawings, it should be noted that like reference numerals are used to depict the same or similar elements, features, and structures.

DETAILED DESCRIPTION

Figure 1:
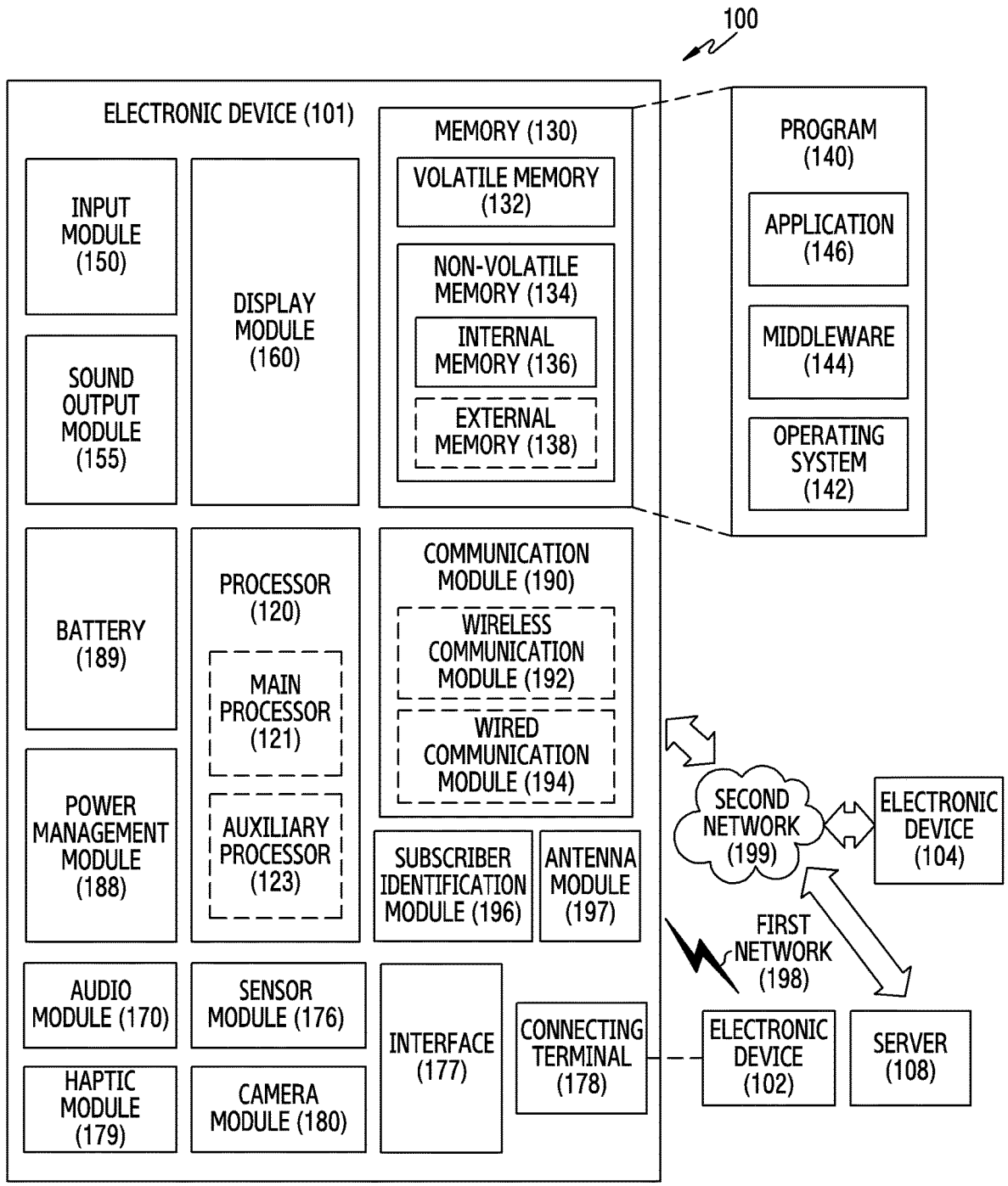
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistant (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable devices may include at least one of accessories (for example, watches, rings, bracelets, ankle bracelets, necklaces, glasses, contact lenses, head-mounted-devices (HMDs), etc.), fabric- or clothing-mounted devices (for example, electronic apparels), body-mounted devices (for example, skin pads, tattoos, etc.), or bio-implantable circuits.

According to some embodiments, the electronic device may be a home appliance. The home appliance may include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, TV boxes, game consoles, electronic dictionaries, electronic keys, camcorders, or electronic picture frames.

According to other embodiments, the electronic device may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite systems (GNSS), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, or Internet of things (for example, light bulbs, various sensors, electricity or gas meters, sprinkler devices, fire alarms, thermostats, street lamps, toasters, exercise equipment, hot water tanks, heaters, boilers, or the like).

According to an embodiment, the electronic device may include at least one of furniture, a part of buildings/structures, electronic boards, electronic signature receiving devices, projectors, or various measuring instruments (for example, water meters, electricity meters, gas meters, or wave meters). In various embodiments, the electronic device may be one or a combination of two or more devices of the above-mentioned devices. According to a certain embodiment, the electronic device may be a flexible electronic device. Also, the electronic device according to various embodiments of the disclosure is not limited to the above-mentioned devices, and may include new electronic devices according to technology development.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 is a block diagram of an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or may communicate with an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In a certain embodiment, at least one (e.g., the display device 160 or the camera module 180) of the components may be omitted from the electronic device 101, or one or more other components may be added in the electronic device 101. In a certain embodiment, some of the components may be implemented by one integrated circuit. For example, the sensor module 176 (for example, a fingerprint sensor, an iris sensor, or an illuminance sensor) may be implemented by being embedded in the display device 160 (for example, a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in a volatile memory 132, may process a command or data stored in the volatile memory 132, and may store resulting data in a non-volatile memory 134. According to an embodiment, the processor 120 may include a main processor 121 (e.g., a central processing device or an application processor), or an auxiliary processor 123 (e.g., a graphics processing device, an image signal processor, a sensor hub processor, or a communication processor) that is operable independently from, or in conjunction with, the main processor 121. Additionally or alternatively, the auxiliary processor 123 may be set to consume lower power than the main processor 121, or to be specific to a designated function. The auxiliary processor 123 may be implemented as separate from, or as part of the main processor 121.

The auxiliary processor 123 may control at least part of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of other components (e.g., the camera module 180 or the communication module 190) functionally related thereto.

The memory 130 may store various data used by at least one component (e.g., the processor 120 or the sensor module 176) of the electronic device 101. Data may include, for example, software (e.g., the program 140) and input data or output data regarding a command related thereto. The memory 130 may include the volatile memory 132 or the non-volatile memory 134.

The program 140 may be stored in the memory 130 as software, and may include, for example, an operating system 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (for example, a stylus pen).

The sound output device 155 may output sound signals to the outside of the electronic device 101. The sound output device 155 may include, for example, a speaker or a receiver. The speaker may be used for general purposes, such as playing multimedia or playing record. The receiver may be used to receive an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and a control circuitry to control a corresponding device. According to an embodiment, the display device 160 may include a touch circuitry set to detect a touch, or a sensor circuitry (for example, a pressure sensor) set to measure an intensity of force generated by the touch.

The audio module 170 may convert a sound into an electrical signal or, reversely, may convert an electrical signal into a sound. According to an embodiment, the audio module 170 may obtain a sound via the input device 150, or may output a sound via the sound output device 155 or an external electronic device (e.g., the electronic device 102) (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device, and may generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support at least one specified protocol to be used for the electronic device 101 to be connected with an external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with an external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be perceived by a user via tactile sensation or kinesthetic sensation of the user. According to an embodiment, the haptic module 179 may include, for example, a motor, a piezoelectric element, or an electric stimulator.

The camera module 180 may shoot a still image or a moving image. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishment of a direct (e.g., wired) communication channel or a wireless communication channel between the electronic device 101 and an external electronic device (e.g., the electronic device 102, the electronic device 104, or the server 108), and performance of communication via the established communication channel. The communication module 190 may include at least one communication processor that is operable independently from the processor 120 (e.g., an application processor) and supports direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). A corresponding communication module of these communication modules may communicate with an external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be integrated into a single component (e.g., a single chip), or may be implemented as a plurality of components (e.g., a plurality of chips) separate from one another. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., an external electronic device). According to an embodiment, the antenna module may include one antenna including a radiator which is formed of a conductor or a conductive pattern formed on a substrate (for example, a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by the communication module 190. A signal or power may be transmitted or received between the communication module 190 and an external electronic device via the selected at least one antenna. According to a certain embodiment, in addition to the radiator, other components (for example, a radio frequency integrated circuit (RFIC)) may be additionally formed as part of the antenna module 197.

At least some of the above-described components may be coupled to one another and may exchange signals (e.g., commands or data) with one another through an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled to the second network 199. Each of the external electronic devices 102, 104 may be a device of a same type as, or a different type, from the electronic device 101. According to an embodiment, all or a part of operations executed at the electronic device 101 may be executed in one or more external electronic devices of the external electronic devices 102, 104, or 108. For example, if the electronic device 101 should perform a function or a service automatically, or in response to a request from a user or another device, the electronic device 101, instead of or in addition to executing the function or the service, may request one or more external electronic devices to perform at least part of the function or the service. The one or more external electronic devices receiving the request may perform at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To achieve this, cloud computing, distributed computing, or client-server computing technology may be used, for example.

Figure 2:
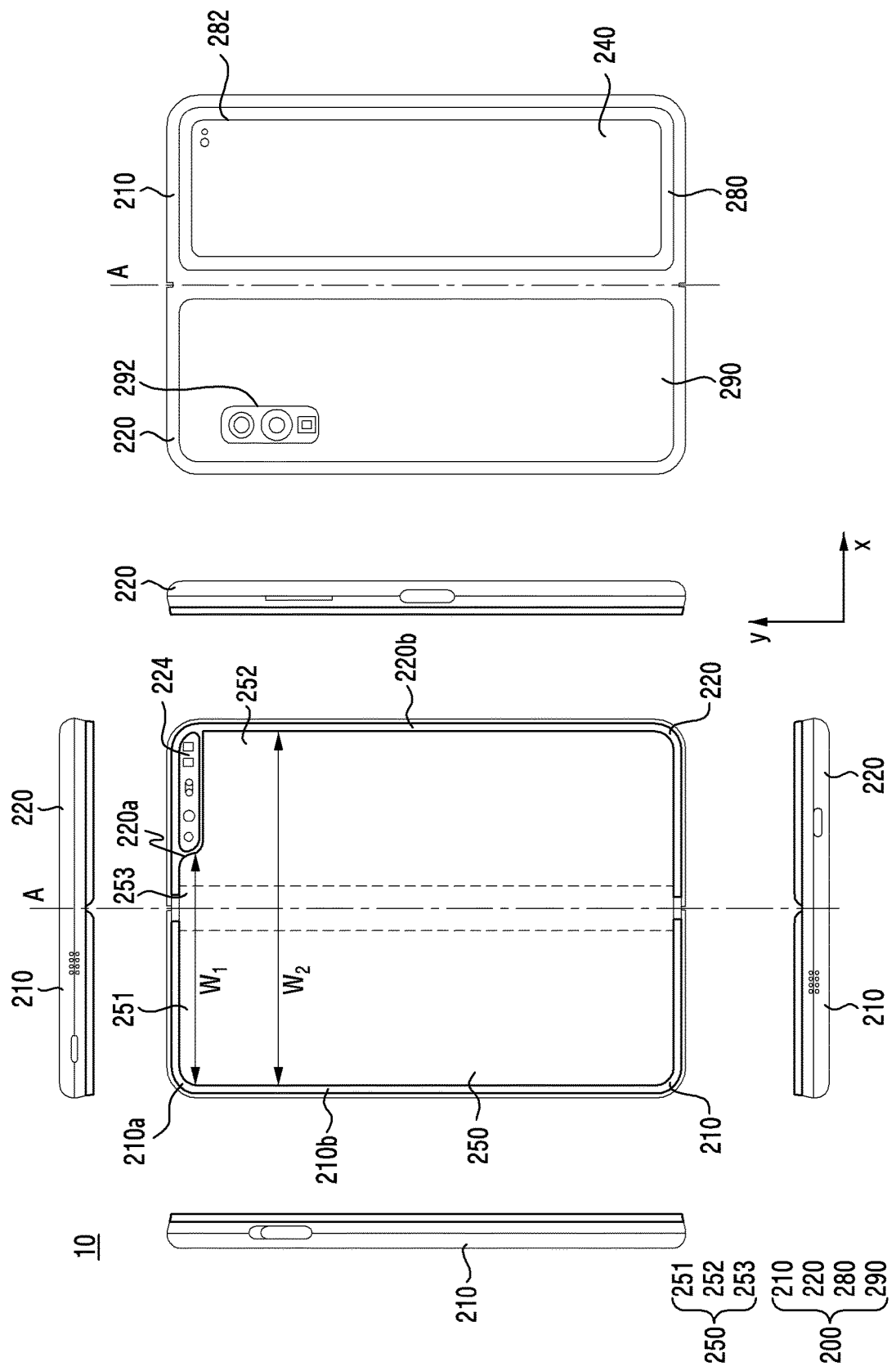
FIG. 2 is a view illustrating a flat state of an electronic device according to an embodiment of the disclosure.

FIG. 2 is a view illustrating a flat state of an electronic device according to an embodiment of the disclosure.

Figure 3:
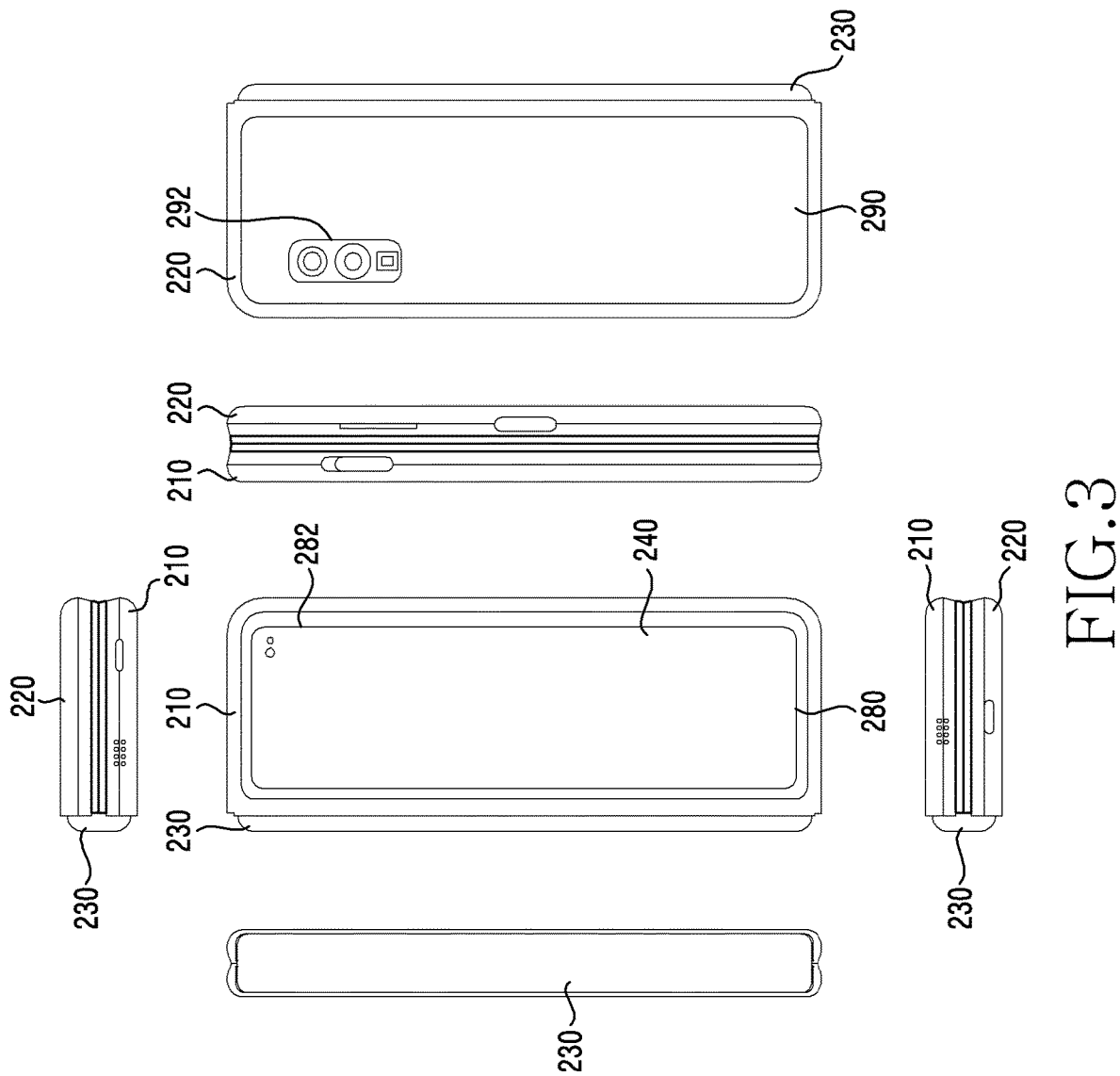
FIG. 3 is a view illustrating a folded state of an electronic device according to an embodiment of the disclosure.

FIG. 3 is a view illustrating a folded state of an electronic device according to an embodiment of the disclosure.

Referring to FIGS. 2 and 3, an electronic device 10 may include a foldable housing 200, a hinge cover 230 which covers a foldable portion of the foldable housing, and a flexible or foldable display 250 (hereinafter, referred to as a "display" 250) disposed in a space formed by the foldable housing 200. In the disclosure, a surface on which the display 250 is disposed is defined as a first surface or a front surface of the electronic device 10. The opposite surface of the front surface is defined as a second surface or a rear surface of the electronic device 10. A surface surrounding a space between the front surface and the rear surface is defined as a third surface or a side surface of the electronic device 10.

The foldable housing 200 may include a first housing structure 210, a second housing structure 220 including a sensor area 224, a first rear surface cover 280, and a second rear surface cover 290. The foldable housing 200 of the electronic device 10 is not limited to the shape and coupling illustrated in FIGS. 2 and 3, and may be implemented by a combination and/or coupling of other shapes or components. For example, in another embodiment, the first housing structure 210 and the first rear surface cover 280 may be integrally formed with each other, and the second housing structure 220 and the second rear surface cover 290 may be integrally formed with each other.

In the illustrated embodiment, the first housing structure 210 and the second housing structure 220 may be disposed on both sides with reference to a folding axis (A axis), and may have a substantially symmetrical shape with respect to the folding axis A. As will be described below, the first housing structure 210 and the second housing structure 220 may have an angle or a distance therebetween that is changed according to whether the electronic device 10 is in a flat state, a folded state, or an intermediate state. In the illustrated embodiment, the second housing structure 220 additionally includes the sensor area 224 where various sensors are disposed, differently from the first housing structure 210, but may have a symmetrical shape on the other area.

As shown in FIG. 2, the first housing structure 210 and the second housing structure 220 may form a recess to accommodate the entirety of the display 250. In the illustrated embodiment, the recess may have two or more different widths in a direction perpendicular to the folding axis A due to the sensor area 224.

For example, the recess may have (1) a first width w1 between a first portion 210a of the first housing structure 210 that is parallel to the folding axis A, and a first portion 220a of the second housing structure 220 that is formed on an edge of the sensor area 224, and (2) a second width w2 formed by a second portion 210b of the first housing structure 210 and a second portion 220b of the second housing structure 220 that does not correspond to the sensor area 224 and is parallel to the folding axis A. In this case, the second width w2 may be longer than the first width w1. In other words, the first portion 210a of the first housing structure 210 and the first portion 220a of the second housing structure 220, which have an asymmetrical shape, may form the first width w1 of the recess, and the second portion 210b of the first housing structure 210 and the second portion 220b of the second housing structure 220, which have a symmetrical shape, may form the second width w2 of the recess. The first portion 220a and the second portion 220b of the second housing structure 220 may have different distances from the folding axis A. The width of the recess is not limited to the illustrated example. In various embodiments, the recess may have a plurality of widths according to a shape of the sensor area 224 or portions of the first housing structure 210 and the second housing structure 220 that have an asymmetrical shape.

At least part of the first housing structure 210 and the second housing structure 220 may be formed with a metallic material or a nonmetallic material having stiffness of a size selected to support the display 250.

The sensor area 224 may be formed to have a predetermined area adjacent to one corner of the second housing structure 220. However, the disposal, shape, and size of the sensor area 224 are not limited to the illustrated example. For example, in another embodiment, the sensor area 224 may be provided on another corner of the second housing structure 220 or a certain area between an upper end corner and a lower end corner. Components which are embedded in the electronic device 10 to perform various functions may be exposed to the front surface of the electronic device 10 through the sensor area 224 or one or more openings provided on the sensor area 224. The components may include various types of sensors. The sensors may include, for example, at least one of a front-facing camera, a receiver, or a proximity sensor.

The first rear surface cover 280 may be disposed on one side of the folding axis on the rear surface of the electronic device, and for example, may have a substantially rectangular periphery and may have the periphery surrounded by the first housing structure 210. Similarly, the second rear surface cover 290 may be disposed on the other side of the folding axis on the rear surface of the electronic device, and may have a periphery surrounded by the second housing structure 220.

In the illustrated embodiment, the first rear surface cover 280 and the second rear surface cover 290 may have a substantially symmetrical shape with reference to the folding axis (A axis). However, the first rear surface cover 280 and the second rear surface cover 290 may not necessarily have the symmetrical shape, and in another embodiment, the electronic device 10 may include the first rear surface cover 280 and the second rear surface cover 290 of various shapes. In another embodiment, the first rear surface cover 280 may be integrally formed with the first housing structure 210, and the second rear surface cover 290 may be integrally formed with the second housing structure 220.

The first rear surface cover 280, the second rear surface cover 290, the first housing structure 210, and the second housing structure 220 may form a space to have various components (e.g., a printed circuit board or a battery) of the electronic device 10 disposed therein. One or more components may be disposed on the rear surface of the electronic device 10 or may be visually exposed. For example, at least part of a sub display 240 may be visually exposed through a first rear surface area 282 of the first rear surface cover 280. In another embodiment, one or more components or a sensor may be visually exposed through a second rear surface area 292 of the second rear surface cover 290. In various embodiments, the sensor may include a proximity sensor and/or a rear-facing camera.

Referring to FIG. 3, the hinge cover 230 may be disposed between the first housing structure 210 and the second housing structure 220, and may be configured to hide inner components (e.g., a hinge structure). The hinge cover 230 may be hidden by a portion of the first housing structure 210 and the second housing structure 220, or may be exposed to the outside, according to a state (a flat state or a folded state) of the electronic device 10.

For example, when the electronic device 10 is in the flat state as shown in FIG. 2, the hinge cover 230 may be hidden by the first housing structure 210 and the second housing structure 220 and may not be exposed. When the electronic device 10 is in the folded state (e.g., a fully folded state) as shown in FIG. 3, the hinge cover 230 may be exposed to the outside between the first housing structure 210 and the second housing structure 220. In an intermediate state in which the first housing structure 210 and the second housing structure 220 are folded with a certain angle, the hinge cover 230 may be exposed to the outside in part between the first housing structure 210 and the second housing structure 220. However, in this case, the exposed area may be smaller than in the fully folded state. In an embodiment, the hinge cover 230 may include a curved surface.

The display 250 may be disposed on a space formed by the foldable housing 200. For example, the display 250 may be seated on a recess formed by the foldable housing 200, and may form most of the front surface of the electronic device 10.

Accordingly, the front surface of the electronic device 10 may include the display 250, and some areas of the first housing structure 210 adjacent to the display 250 and some areas of the second housing structure 220. In addition, the rear surface of the electronic device 10 may include the first rear surface cover 280, some areas of the first housing structure 210 that are adjacent to the first rear surface cover 280, the second rear surface cover 290, and some areas of the second housing structure 220 that are adjacent to the second rear surface cover 290.

The display 250 may refer to a display that has at least some areas deformable to a flat surface or a curved surface. The display 250 may include a folding area 253, a first area 251 disposed on one side (the left of the folding area 253 shown in FIG. 2) with reference to the folding area 253, and a second area 252 disposed on the other side (the right of the folding area 253 shown in FIG. 2).

The divided areas of the display 250 shown in FIG. 2 are examples and the display 250 may be divided into a plurality of areas (e.g., four or more areas or two areas) according to a structure or a function of the display 250. For example, in the embodiment illustrated in FIG. 2, the display 250 may be divided into areas by the folding area 253 extended in parallel with the y-axis or the folding axis (A axis), but in another embodiment, the display 250 may be divided into areas with reference to another folding area (e.g., a folding area parallel to the x-axis) or another folding axis (e.g., a folding axis parallel to the x-axis).

The first area 251 and the second area 252 may have a substantially symmetrical shape with reference to the folding area 253. However, the second area 252 may include a notch that is cut according to the presence of the sensor area 224, differently from the first area 251, but may have a symmetrical shape with the first area 251 on the other area. The first area 251 and the second area 252 may include portions that have a symmetrical shape and portions that have an asymmetrical shape.

Hereinafter, operations of the first housing structure 210 and the second housing structure 220 and respective areas of the display 250 according to a state (e.g., a flat state or a folded state) of the electronic device 10 will be described.

When the electronic device 10 is in the flat state (e.g., the state illustrated in FIG. 2), the first housing structure 210 and the second housing structure 220 may form an angle of 180° and may be disposed to face in the same direction. A surface of the first area 251 of the display 250 and a surface of the second area 402 may form an angle of 180° with each other, and may face in the same direction (e.g., the front surface direction of the electronic device). The folding area 253 may form the same plane as the first area 401 and the second area 252.

When the electronic device 10 is in the folded state (e.g., the state illustrated in FIG. 3), the first housing structure 210 and the second housing structure 220 may be disposed to face each other. The surface of the first area 251 of the display 250 and the surface of the second area 252 may face each other while forming a small angle (e.g., between 0° and 10°) with each other. At least part of the folding area 253 may have a curved surface having a predetermined curvature.

When the electronic device 10 is in the intermediate state, the first housing structure 210 and the second housing structure 220 may be disposed with a certain angle. The surface of the first area 251 of the display 250 and the surface of the second area 252 may form an angle that is larger than in the folded state and is smaller than in the flat state. At least part of the folding area 253 may have a curved surface having a predetermined curvature, and the curvature in this state may be smaller than in the folded state.

Figure 4:
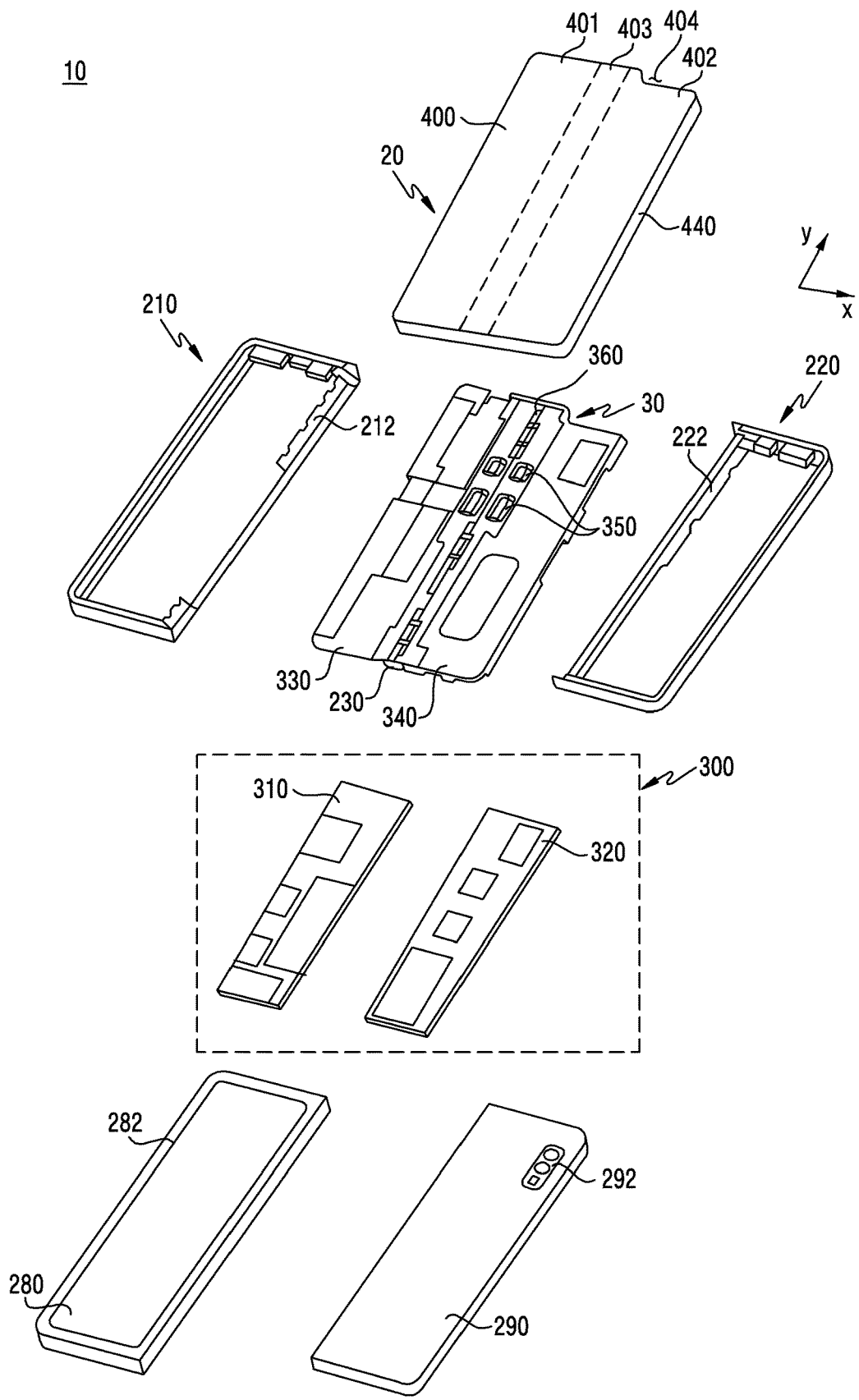
FIG. 4 is an exploded perspective view of an electronic device according to an embodiment of the disclosure.

FIG. 4 is an exploded perspective view of the electronic device according to an embodiment of the disclosure.

Referring to FIG. 4, the electronic device 10 may include a display unit 20, a bracket assembly 30, a board unit 300, a first housing structure 210, a second housing structure 220, a first rear surface cover 280, and a second rear surface cover 290. In the disclosure, the display unit 20 may be referred to as a display module or a display assembly.

The display unit 20 may include a display 400 and one or more plates or layers 440 on which the display 400 is seated. The plate 440 may be disposed between the display 400 and the bracket assembly 30. The display 400 may be disposed on at least part of one surface (e.g., an upper surface in FIG. 4) of the plate 400. The plate 440 may be formed in a shape corresponding to the display 400. For example, a part of the plate 440 may be formed in a shape corresponding to a notch 404 of the display 400.

The bracket assembly 30 may include a first bracket 330, a second bracket 340, a hinge structure disposed between the first bracket 330 and the second bracket 340, a hinge cover 230 to cover the hinge structure when it is viewed from the outside, and a wire member 350 (e.g., a flexible printed circuit (FPC)) crossing over the first bracket 330 and the second bracket 340.

The bracket assembly 30 may be disposed between the plate 440 and the board unit 300. For example, the first bracket 330 may be disposed between a first area 401 of the display 400 and a first board 310. The second bracket 340 may be disposed between a second area 402 of the display 400 and a second board 320.

The wire member 350 and at least part of the hinge structure 360 may be disposed inside the bracket assembly 30. The wire member 350 may be disposed in a direction (e.g., an x-axis direction) of crossing over the first bracket 330 and the second bracket 340. The wire member 350 may be disposed in a direction (for example, the x-axis direction) perpendicular to a folding axis (for example, the y-axis or the folding axis A of FIG. 2A) of the folding area 403 of the electronic device 10.

As mentioned above, the board unit 300 may include the first board 310 disposed on the first bracket 330 side, and the second board 320 disposed on the second bracket 340 side. The first board 310 and the second board 320 may be disposed in a space formed by the bracket assembly 30, the first housing structure 210, the second housing structure 220, the first rear surface cover 280, and the second rear surface cover 290. Components for implementing various functions of the electronic device 10 may be mounted on the first board 310 and the second board 320.

The first housing structure 210 and the second housing structure 220 may be assembled with each other to be coupled to both sides of the bracket assembly 30 with the display unit 20 being coupled to the bracket assembly 30. As will be described below, the first housing structure 210 and the second housing structure 220 may slide from both sides of the bracket assembly 30 and may be coupled with the bracket assembly 30.

The first housing structure 210 may include a first rotation support surface 212, and the second housing structure 220 may include a second rotation support surface 222 corresponding to the first rotation support surface 212. The first rotation support surface 212 and the second rotation support surface 222 may include curved surfaces corresponding to curved surfaces included in the hinge cover 230.

When the electronic device 10 is in the flat state (e.g., the electronic device of FIG. 2), the first rotation support surface 212 and the second rotation support surface 222 may cover the hinge cover 230, such that the hinge cover 230 is not exposed to the rear surface of the electronic device 10 or is exposed to the minimum. On the other hand, when the electronic device 10 is in the folded state (e.g., the electronic device of FIG. 3), the first rotation support surface 212 and the second rotation support surface 222 may rotate along the curved surface included in the hinge cover 230, such that the hinge cover 230 is exposed to the rear surface of the electronic device 10 to the maximum.

Figure 5:
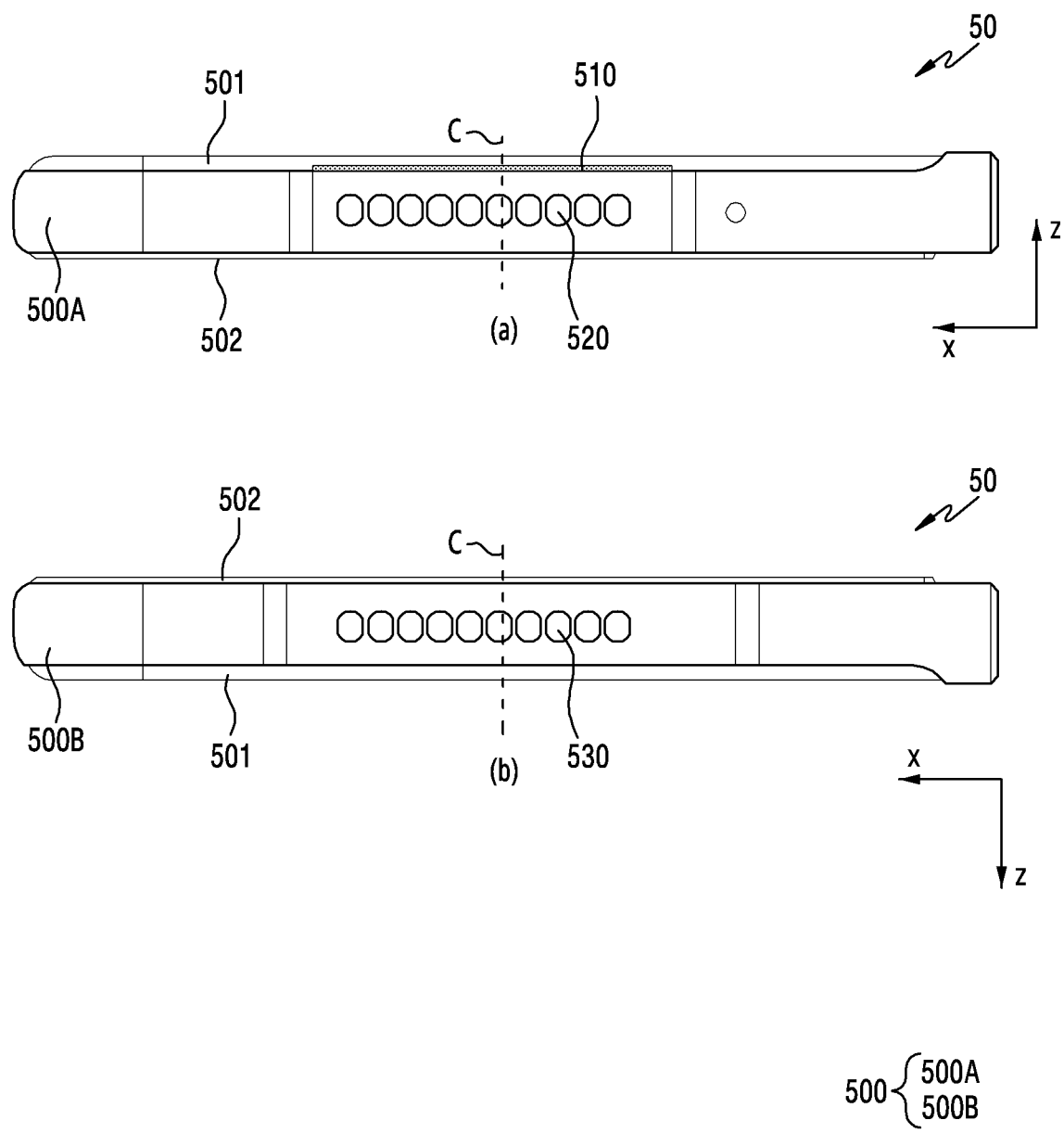
FIG. 5 is a top view illustrating an upper end side surface and a lower end side surface of an electronic device according to an embodiment of the disclosure.

FIG. 5 is a top view illustrating an upper end side surface and a lower end side surface of an electronic device according to an embodiment of the disclosure.

Regarding an electronic device 50, reference is made to the electronic device 10 shown in FIGS. 2 to 4. For example, a housing 500 of FIG. 5 is the same as or substantially the same as the first housing structure 210 of FIG. 2. However, this should not be considered as limiting. Redundant explanations of the same components or substantially the same components as those described above will be omitted.

Referring to FIG. 5, the electronic device 50 may include the housing 500, a front surface 501 of the electronic device 50, and a rear surface 502 which is opposite to the front surface 501. The housing 500 may form a side surface of the electronic device 50 that surrounds a space between the front surface 501 and the rear surface 502. For example, referring to parts (a) and (b) of FIG. 5, the housing 500 may include an upper end side surface 500A and a lower end side surface 500B of the electronic device 50. However, the configuration of the electronic device 50 is not limited thereto. For example, the electronic device 50 may omit at least one of the above-described components, or may further include at least one other component.

The electronic device 50 may include at least one opening. Referring to part (a) of FIG. 5, the electronic device 50 may include a first opening 510 formed in a direction (+z direction) toward the front surface 501. The first opening 510 may be formed on the housing 500. However, this should not be considered as limiting. For example, the first opening 510 may be formed on the front surface 501 of the electronic device 50. In another example, the first opening 510 may be a space that is formed between the upper end side surface 500A and the front surface 501.

The electronic device 50 may include a plurality of second openings 520 formed on the upper end side surface 500A of the housing 500. The plurality of second openings 520 may be formed in a direction in which the upper end side surface 500A faces. For example, the plurality of second openings 520 may be formed to face in the +y axis direction of FIG. 2.

The lower end side surface 500B of the electronic device 50 may include a plurality of third openings 530. The plurality of third openings 530 may be formed in a direction in which the lower end side surface 500B faces. For example, the plurality of third openings 530 may be formed to face in the −y axis direction of FIG. 2. The plurality of third openings 530 may include a microphone hole of the electronic device. However, this should not be considered as limiting.

The plurality of second openings 520 may be formed to be symmetric with reference to a center axis of the electronic device 50. For example, the electronic device 50 may include the plurality of second openings 520 that are symmetrical with reference to the center axis of the electronic device 50 and have substantially the same size and shape. The electronic device 50 may include the plurality of second openings 520 which have the same number of openings symmetrical with reference to the center axis of the electronic device 50. The center axis refers to a center axis C of part (a) of FIG. 5. The plurality of second openings 520 may be formed to be symmetrical with reference to the center axis of the electronic device 50, so that aesthetic quality of the electronic device 50 may be enhanced.

The plurality of third openings 530 may be formed to be symmetric with reference to the center axis C. For example, the electronic device 50 may include the plurality of third openings 530 that are symmetrical with reference to the center axis of the electronic device 50 and have substantially the same size and shape. The electronic device 50 may include the plurality of third openings 530 which have the same number of openings symmetrical with reference to the center axis of the electronic device 50. The center axis refers to a center axis C of part (b) of FIG. 5. The plurality of third openings 530 may be formed to be symmetrical with reference to the center axis C of the electronic device 50, so that aesthetic quality of the electronic device 50 may be enhanced.

The plurality of second openings 520 and the plurality of third openings 530 may be formed to be symmetrical to each other. Although not shown in FIG. 5, the plurality of second openings 520 and the plurality of third openings 530 may be formed to be symmetrical to each other with reference to a center axis that is perpendicular to a longitudinal direction of the electronic device 50. The plurality of second openings 520 and the plurality of third openings 530 may have substantially the same size and shape with reference to the center axis of the electronic device 50 that is perpendicular to the longitudinal direction of the electronic device 50. The plurality of second openings 520 and the plurality of third openings 530 may be formed to be symmetrical to each other, so that aesthetic quality of the electronic device 50 may be enhanced.

The number of the plurality of second openings 520 and the number of the plurality of third openings 530 may be the same as each other. The number of the plurality of second openings 520 and the number of the plurality of third openings 530 may be the same as each other, so that aesthetic quality of the electronic device 50 may be enhanced.

At least one of the first opening 510, the plurality of second openings 520 or the plurality of third openings 530 may be formed through computerized numerical control (CNC) processing. However, this should not be considered as limiting.

Figure 6:
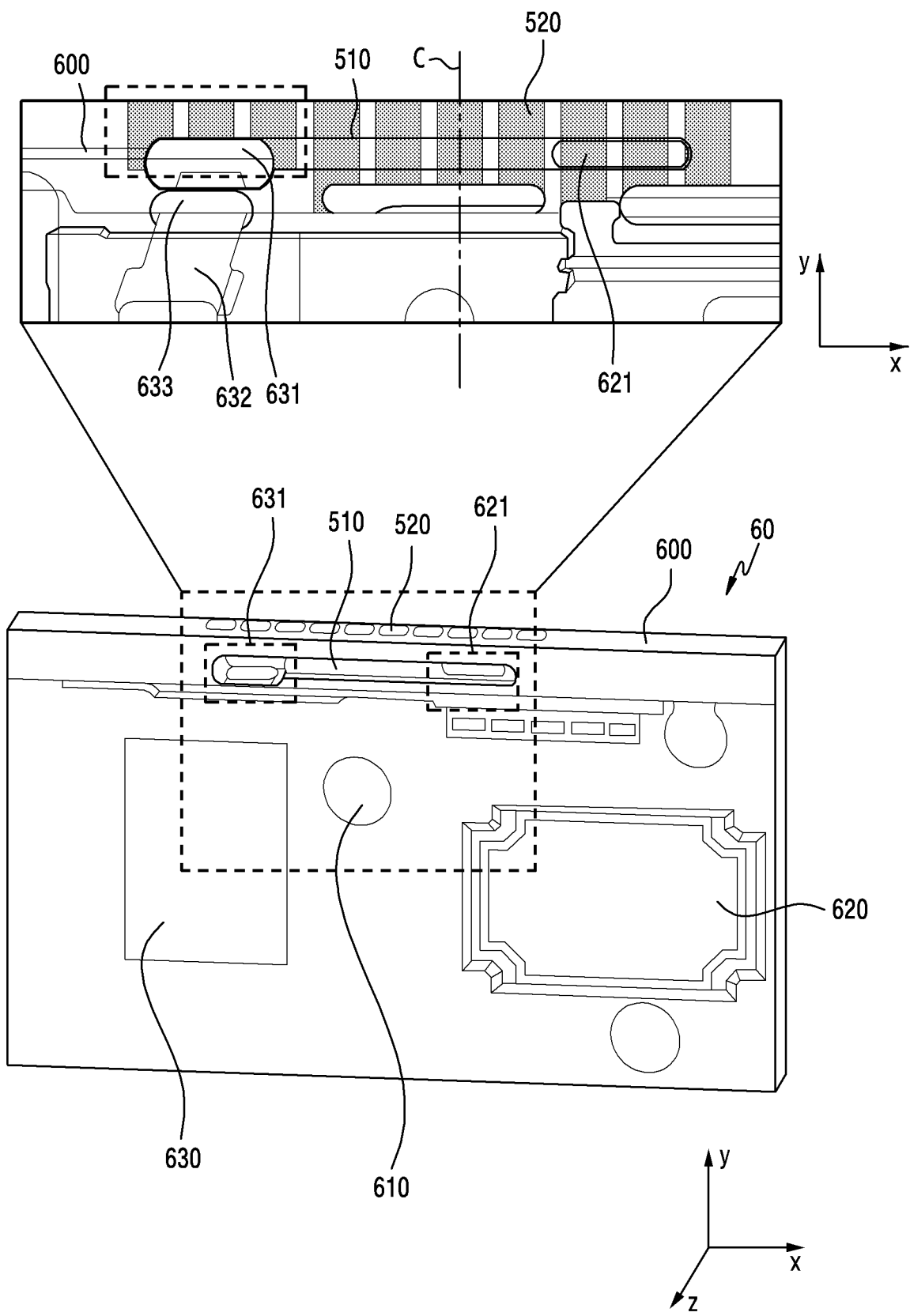
FIG. 6 is a view illustrating an acoustic structure according to an embodiment of the disclosure.

FIG. 6 illustrates an acoustic structure according to an embodiment of the disclosure.

Regarding an electronic device 60, reference is made to the electronic device 50 of FIG. 5. Redundant explanations of the same components or substantially the same components as those described above will be omitted.

Referring to FIG. 6, the electronic device 60 may include a housing 600. The electronic device 60 may include various components inside the housing 600. The electronic device 60 may include a camera 610 disposed in the housing 600. The electronic device 60 may include the camera 610 disposed in the housing 600, spaced apart from an upper end periphery by a first length in a first direction (−y axis direction) that is perpendicular to the upper end periphery of the electronic device 60 and is toward a lower end periphery of the electronic device 60.

The electronic device 60 may include a speaker 620 and a receiver 630 which are disposed in the housing 600. The speaker 620 and the receiver 630 may be adjacent to the camera 610. The speaker 620 and the receiver 630 may be disposed on sides of the camera 610. For example, the speaker 620 may be disposed on the right side of the camera 610 when the electronic device 60 is viewed from above (−z axis direction). The receiver 630 may be disposed on the left side of the camera 610 when the electronic device 60 is viewed from above (−z axis direction). However, this should not be considered as limiting. For example, the speaker 620 may be disposed on the left side of the camera 610 and the receiver 630 may be disposed on the right side of the camera 610 when the electronic device is viewed from above (−z axis direction).

The electronic device 60 may output a sound through the speaker 620. A sound (hereinafter, referred to as a "first sound") outputted from the speaker 620 may be discharged to the outside of the electronic device 60 through the first opening 510 and some of the plurality of second openings 520. The first opening 510 may include a speaker sound output hole 621 that faces the front surface of the electronic device 60 (e.g., in a +z axis direction). In this case, the first sound outputted from the speaker 620 may be discharged to the outside of the electronic device 60 through the speaker sound output hole 621 and the first opening 510 in sequence. However, this should not be considered as limiting. For example, in the case above, the first sound outputted from the speaker 620 may be discharged to the outside of the electronic device 60 through some of the plurality of second openings 520. The first sound outputted from the speaker 620 may be discharged to the outside of the electronic device 60 through the first opening 510 or at least one of the plurality of second openings 520. The sound outputted from the speaker 620 may be discharged to the outside of the electronic device 60 through the first opening 510 or at least one of the plurality of second openings 520 for the sake of stereo side radiation. However, this should not be considered as limiting.

The electronic device 60 may output a sound through the receiver 630. The housing 600 may include a sound output path 632 which is a space connecting the receiver 630 and the first opening 510, and a penetrating hole 633 which is formed between the first opening 510 and the sound output path 632. The penetrating hole 633 may be formed at one end of the sound output path 632. A sound (hereinafter, referred to as a "second sound") outputted from the receiver 630 may be propagated through the sound output path 632. The propagated second sound may be discharged to the outside of the electronic device 60 through the penetrating hole 633 and the first opening 510 in sequence. The first opening 510 may include a receiver sound output hole 631 that faces the front surface of the electronic device 60 (e.g., in a +z axis direction). In this case, the second sound outputted from the receiver 630 may be discharged to the outside of the electronic device 60 through the sound output path 632, the penetrating hole 633, the receiver sound output hole 631 and the first opening 510 in sequence.

The sound output path 632 and the penetrating hole 633 may be positioned to be close to the center axis C of the electronic device 60. For example, the sound output path 632 and the penetrating hole 633 may be disposed adjacent to the camera 610. As the sound output path 632 and the penetrating hole 633 are closer to the center axis C, a sound pressure of the receiver 630 rises so that acoustic performance of the electronic device 60 may be enhanced.

The sound output path 632 and the penetrating hole 633 may be disposed close to the center axis C, such that at least some of the plurality of second openings 520 and a path of a sound outputted from the receiver may be connected. For example, at least two of the plurality of second openings 520 may be connected with the first opening 510, the sound output path 632, and the penetrating hole 633. In this case, the second sound outputted from the receiver 630 may be discharged to the outside of the electronic device 60 through at least some of the plurality of second openings 520. As the second sound is discharged through at least some of the plurality of second openings 520, the performance of the electronic device 60 may be degraded. For example, the performance of the electronic device 60 may be degraded in all frequency bands.

The electronic device 60 may include at least one shielding structure to prevent the second sound from being discharged through at least some of the plurality of second openings 520. The shielding structure may be disposed between an upper end periphery of the electronic device 60 and the camera 610 in the housing 600. However, this should not be considered as limiting. The shielding structure will be described below in detail with reference to FIGS. 8A and 8B.

Figure 7A:
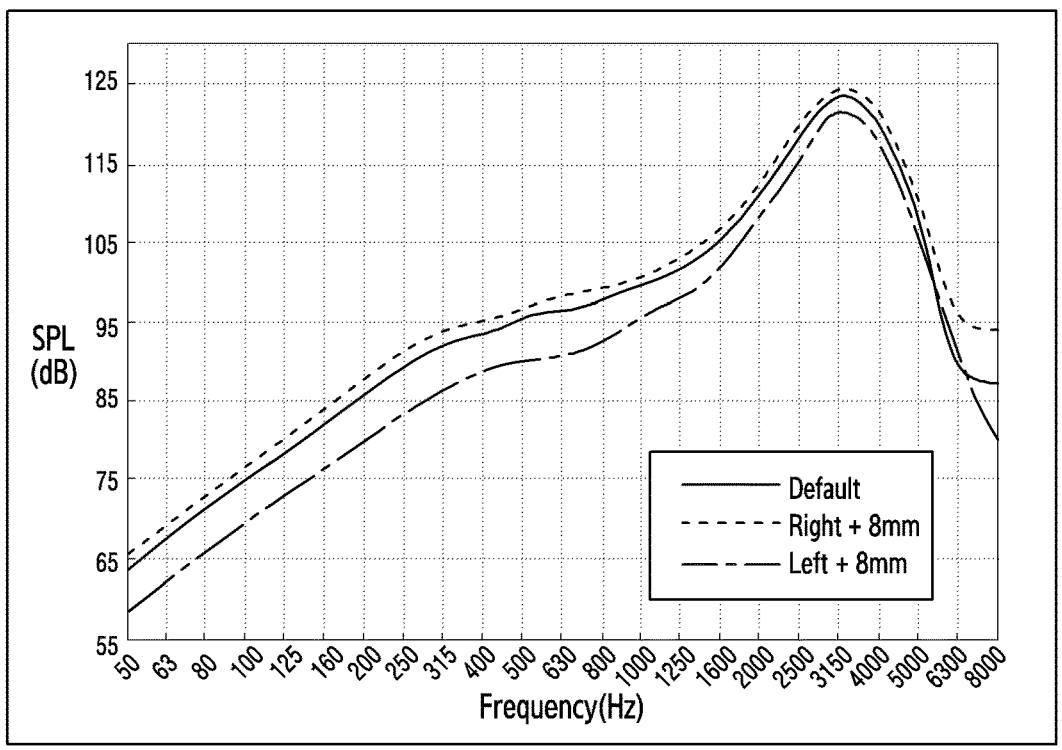
FIGS. 7A and 7B are views illustrating graphs showing effects of an acoustic structure according to various embodiments of the disclosure.
Figure 7B:
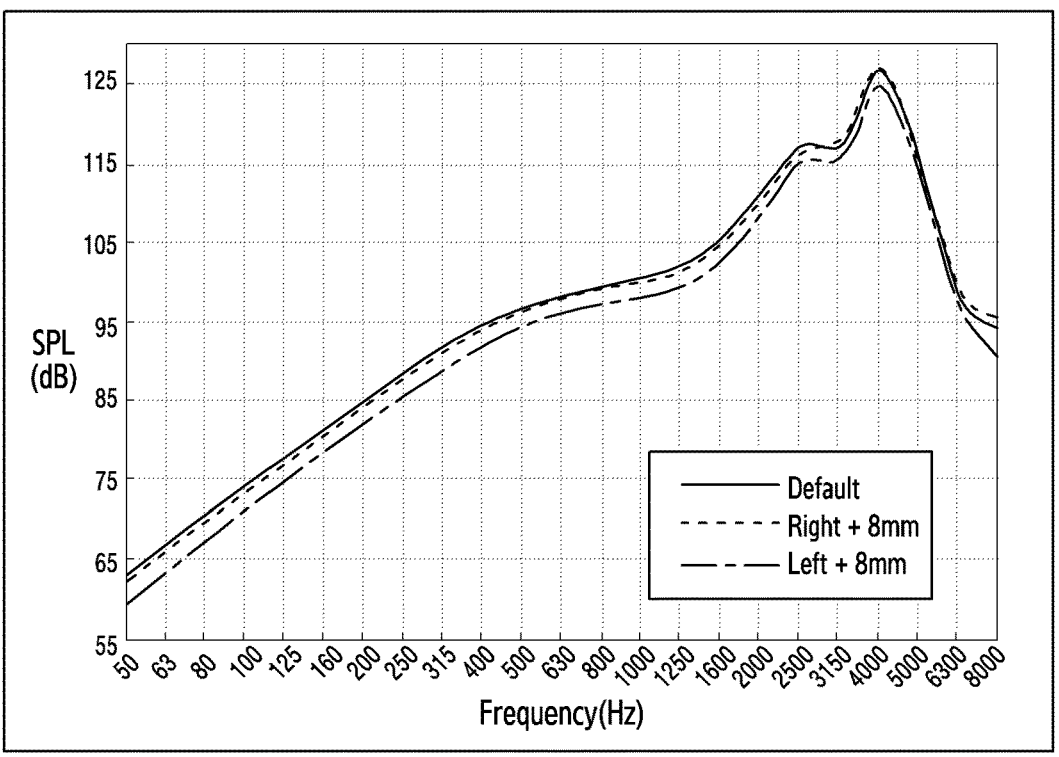

FIGS. 7A and 7B illustrate graphs regarding effects of an acoustic structure according to various embodiments of the disclosure.

Referring to FIGS. 7A and 7B, the graphs may be graphs regarding a deviation reduction effect of a sound pressure level (SPL) according to positions of the sound output path 632 and the penetrating hole 633 when a user grips the electronic device on the left (e.g., left hand grip) or the right (e.g., right hand grip). The graph illustrated in FIG. 7A may be a graph showing a deviation of sound pressure levels in a related-art acoustic structure when a user grips an electronic device on the left or right. The graph illustrated in FIG. 7B may be a graph showing a deviation of sound pressure levels in an acoustic structure according to the disclosure when a user grips an electronic device on the left or right. The related-art acoustic structure refers to a related-art acoustic structure (e.g., a structure in which a sound output path and a penetrating hole are spaced apart from a center axis of an electronic device by a predetermined distance or more), which is compared with an acoustic structure disclosed in the disclosure (e.g., an acoustic structure in which a sound output path (632 of FIG. 6) and a penetrating hole (633 of FIG. 6) are disposed close to a center axis of an electronic device (60 of FIG. 6)). The x-axis in the graphs shown in FIGS. 7A and 7B may indicate frequencies (Hz), and the y-axis may indicate sound pressure levels (SPL (dB)).

As the sound output path (632 of FIG. 6) and the penetrating hole (633 of FIG. 6) are disposed closer to the center axis of the electronic device (60 of FIG. 6), a deviation of sound pressure levels according to a grip state of a user for the electronic device may be reduced. For example, as the sound output path (632 of FIG. 6) and the penetrating hole (633 of FIG. 6) are disposed closer to the center axis of the electronic device (60 of FIG. 6), a deviation between a sound pressure when the user grips the electronic device with the right hand and a sound pressure when the user grips the electronic device with the left hand may be reduced. A delta value of table 1 and table 2 presented below refers to a deviation value between a sound pressure when the user grips the electronic device with the right hand and a sound pressure when the user grips the electronic device with the left hand.

Referring to the graph shown in FIG. 7A and table 1 presented below, as the sound output path 632 and the penetrating hole 633 are farther away from the center axis of the electronic device 60, a deviation between SPLs of the left side and the right side of the electronic device may increase.

TABLE 1

| Frequency band (kHz) | | Default | Right + 8 mm | Left + 8 mm | Delta |
|---|---|---|---|---|---|
| Low band | 50 Hz~500 Hz | Ref | 1.6 | −5.4 | 7.0 |
| Intermediate and high band | 500 Hz~2 kHz | Ref | 1.4 | −4.3 | 5.7 |
| NB | 2 kHz~4 kHz | Ref | 1.1 | −2.7 | 3.8 |
| WB | 4 kHz~8 kHz | Ref | 4.2 | −2.6 | 6.8 |

Referring to the graph shown in FIG. 7B and table 2 presented below, as the sound output path 632 and the penetrating hole 633 are disposed closer to the center axis of the electronic device 60, a deviation between SPLs of the left side and the right side of the electronic device may decrease.

TABLE 2

| Frequency band (kHz) | | Default | Right + 8 mm | Left + 8 mm | Delta |
|---|---|---|---|---|---|
| Low band | 50 Hz~500 Hz | Ref | −0.3 | −2.5 | 2.3 |
| Intermediate and high band | 500 Hz~2 kHz | Ref | −0.2 | −2.1 | 1.9 |
| NB | 2 kHz~4 kHz | Ref | −0.1 | −2.0 | 1.9 |
| WB | 4 kHz~8 kHz | Ref | 0.6 | −2.0 | 2.6 |

Figure 8A:
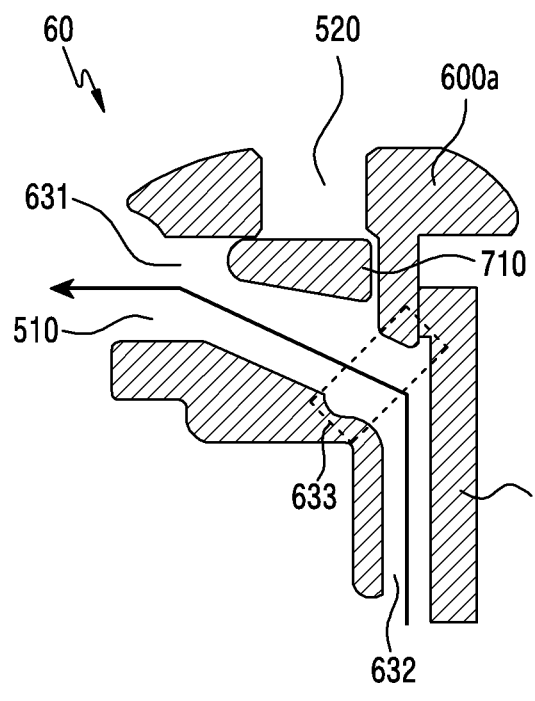
FIGS. 8A and 8B are cross-sectional views of an acoustic structure according to various embodiments of the disclosure.
Figure 8B:
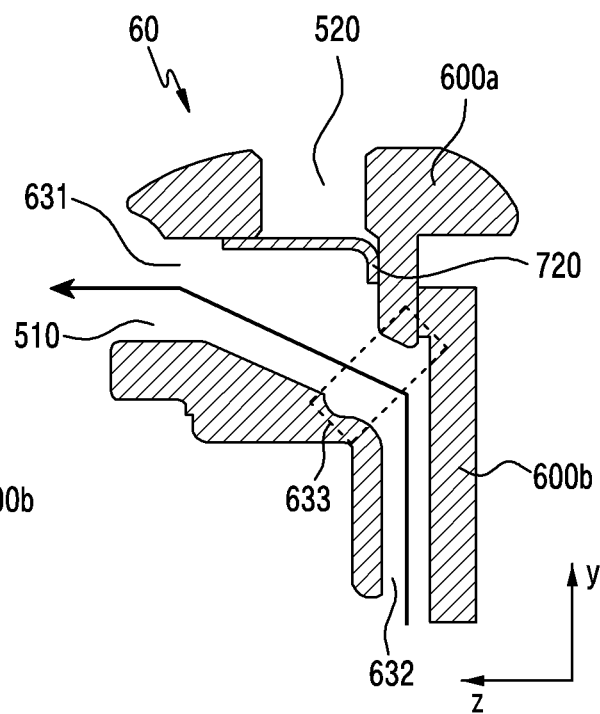

When a deviation value (Delta value of table 1 and table 2) between a sound pressure when the user grips the electronic device with the right hand and a sound pressure when the user grips the electronic device with the left hand is greater than or equal to 3 dB, the user may recognize the deviation of sound pressures when the user grips the electronic device on the left or right. As the sound output path (632 of FIG. 6) and the penetrating hole (633 of FIG. 6) are disposed closer to the center axis of the electronic device (60 of FIG. 6), a deviation of sound pressures when the user grips the electronic device on the left or right, which is perceivable by the user, may decrease. Accordingly, a balance of left/right sounds of the electronic device may be enhanced, and usability of the electronic device for the user may be enhanced. FIGS. 8A and 8B illustrates a cross-section of an acoustic structure according to an embodiment.

Regarding an electronic device 60, reference is made to the electronic device 50 of FIG. 5 and the electronic device 60 of FIG. 6. Redundant explanations of the same components or substantially the same components as those described above will be omitted.

FIGS. 8A and 8B are cross-sectional views of an acoustic structure according to various embodiments of the disclosure.

Referring to FIGS. 8A and 8B, the electronic device 60 may include a housing 600. The housing 600 may include a first housing 600a and a second housing 600b which form a side surface of the electronic device 60. The first housing 600a and the second housing 600b may be separately formed. However, this should not be considered as limiting. For example, the first housing 600a and the second housing 600b may be integrally formed. The first housing 600a and the second housing 600b may be formed to surround a space formed between a front surface and a rear surface of the electronic device 60.

The housing 600 may include at least one opening. For example, the housing 600 may include a plurality of second openings 520 formed in a direction (+y axis direction) that faces a side surface of the electronic device 60, and a first opening 510 formed in a direction (+z axis direction) that faces the front surface of the electronic device 60. The first opening 510 may include a receiver sound output hole 631 formed in a direction facing the front surface of the electronic device 60. The plurality of second openings 520 may be formed in the first housing 600a. However, this should not be considered as limiting.

The housing 600 may include a sound output path 632 and a penetrating hole 633. For example, the second housing 600b may include the sound output path 632. The sound output path 632 may connect a receiver and the first opening 510. The sound output path 632 may refer to a path through which a sound outputted from the receiver is propagated. The penetrating hole 633 may be formed at one end of the sound output path 632. For example, the penetrating hole 633 may be formed between the sound output path 632 and the first opening 510. A sound output from the receiver may be propagated to the penetrating hole 633 along the sound output path 632, and may be discharged to the first opening 510 through the receiver sound output hole 631 in sequence. For example, the arrow illustrated in FIGS. 8A and 8B indicates a path through which a sound outputted from the receiver is propagated along the inside of the electronic device 60 and is discharged to the outside of the electronic device 60.

At least two of the plurality of second openings 520 may be shielded. Referring to FIGS. 8A and 8B, at least two of the plurality of second openings 520 may be shielded by a shielding structure (e.g., 710 or 720). The shielding structure may block a sound output from the receiver from being discharged to the outside of the electronic device 60 through at least some of the plurality of second openings 520. Accordingly, the shielding structure may prevent degradation of acoustic performance of the electronic device which may be caused as a sound outputted from the receiver is discharged through at least some of the plurality of second openings 520.

Referring to FIG. 8A, the shielding structure 710 may include a plate shape. The shielding structure 710 may be bonded or coupled to at least two of the plurality of second openings 520 to shield at least some of the plurality of second openings 520. For example, the shielding structure 710 may be bonded to or coupled to at least two of the second openings 520 through an adhesive member coated over at least some of circumferences of the plurality of second openings 520. The adhesive member may include at least one of a tape or a bond. However, this should not be considered as limiting.

According to an embodiment of the disclosure, the shielding structure 710 may be formed with rubber. However, this should not be considered as limiting. For example, the shielding structure 710 may be formed with plastic or a material including elasticity. According to another embodiment, the shielding structure 710 may be integrally formed with the housing 600 which is formed with a metal material.

Referring to FIG. 8B, the shielding structure 720 may include a tape-like shape. For example, at least two of the plurality of second openings 520 may be shielded by at least one of a tape or a bond. A tape or a bond may be coated over at least some of the plurality of second openings 520 to shield at least some of the plurality of second openings 520. However, this should not be considered as limiting.

FIGS. 9A, 9B, and 9C are perspective views illustrating shielding structures according to various embodiments of the disclosure.

Figure 10:
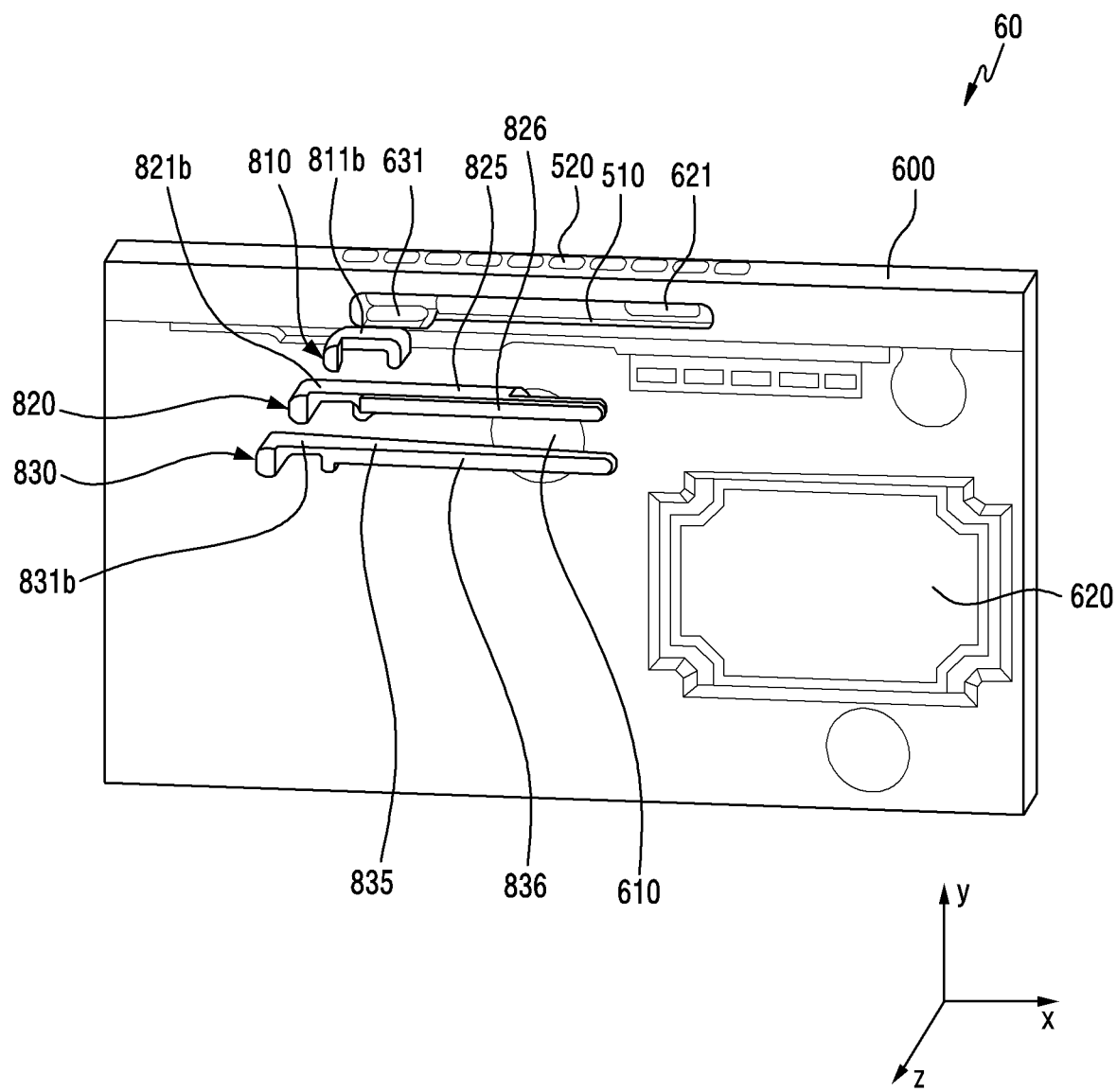
FIG. 10 is an exploded perspective view illustrating an acoustic structure according to an embodiment of the disclosure.

FIG. 10 is an exploded perspective view illustrating an acoustic structure according to an embodiment of the disclosure.

Referring to FIGS. 9A to 9C and 10, an electronic device 60 may include a shielding structure. The shielding structure may have various shapes. For example, a shielding structure 810 (hereinafter, referred to as a "first shielding structure") illustrated in FIG. 9A may include a first structure 811, a first protrusion member 812 which is extended from the first structure 811 in a −y axis direction, and a second protrusion member 813 which is spaced apart from the first protrusion member 812 by a predetermined distance and is extended from the first structure 811 in the −y axis direction. However, this should not be considered as limiting. For example, referring to a shielding structure 820 (hereinafter, referred to as a "second shielding structure") illustrated in FIG. 9B, the second shielding structure 820 may further include a second structure 825 which is extended from a first structure 821 in a direction (+x axis direction) from a first protrusion member 822 toward a second protrusion member 823. Referring to a shielding structure 830 (hereinafter, referred to as a "third shielding structure") illustrated in FIG. 9C, the third shielding structure 830 may further include a second structure 835 which is extended from a first structure 831 in a direction (+x axis direction) from a first protrusion member 832 toward a second protrusion member 833. A detailed structure of each shielding structure will be described below in detail.

The first shielding structure 810 illustrated in FIG. 9A may include the first structure 811, the first protrusion member 812 which is extended from the first structure 811 in the −y axis direction, and the second protrusion member 813 which is spaced apart from the first protrusion member 812 by a predetermined distance and is extended from the first structure 811 in the −y axis direction. The first structure 811 may include a first surface 811a and a second surface (811b of FIG. 10) which is opposite to the first surface 811a. The first structure 811, the first protrusion member 812 and the second protrusion member 813 may form a groove 814.

The first shielding structure 810 may include at least one surface which is disposed to face in a direction (+z axis direction) facing the front surface of the electronic device. At least part of the at least one surface may be formed to protrude in the direction (+z axis direction) facing the front surface of the electronic device. For example, one surface 815 of the first shielding structure 810 may be formed to protrude in the direction facing the front surface of the electronic device. However, this should not be considered as limiting.

The second shielding structure 820 illustrated in FIG. 9B may include the first structure 821, the first protrusion member 822 which is extended from the first structure 821 in the −y axis direction, and the second protrusion member 823 which is spaced apart from the first protrusion member 822 by a predetermined distance and is extended from the first structure 821 in the −y axis direction. The first structure 821 may include a first surface 821a and a second surface (821b of FIG. 10) which is opposite to the first surface 821a. The second shielding structure 820 may include at least one surface disposed to face in a direction (+z axis direction) facing the front surface of the electronic device. The first structure 821, the first protrusion member 822 and the second protrusion member 823 may form a groove 824.

The second shielding structure 820 may further include the second structure 825 which is extended from the first structure 821 in the direction (+x axis direction) from the first protrusion member 822 toward the second protrusion member 823. The first structure 821 may be integrally formed with the second structure 825. However, this should not be considered as limiting. For example, the second structure 825 may be formed as a separate member from the first structure 821 and may be bonded or coupled to the first structure 821.

The second shielding structure 820 may include at least one surface which is disposed to face in the direction (+z axis direction) facing the front surface of the electronic device. At least part of the at least one surface may be formed to protrude in the direction (+z axis direction) facing the front surface of the electronic device. For example, at least part of a front surface 826 of the second structure 825 that is disposed to face in the direction (+z axis direction) facing the front surface of the electronic device may be formed to protrude in the direction facing the front surface of the electronic device.

The second structure 825 may include a first area R1 and a second area R2 which is closer to the first structure 821 than the first area R1. A width of the first area R1 may be smaller than a width of the second area R2. However, this should not be considered as limiting.

The third shielding structure 830 illustrated in FIG. 9C may include the first structure 831, the first protrusion member 832 which is extended from the first structure 831 in the −y axis direction, and the second protrusion member 833 which is spaced apart from the first protrusion member 832 by a predetermined distance and is extended from the first structure 831 in the −y axis direction. The first structure 831 may include a first surface 831a and a second surface (831b of FIG. 10) which is opposite to the first surface 831a. The third shielding structure 830 may include at least one surface disposed to face in a direction (+z axis direction) facing the front surface of the electronic device. The first structure 831, the first protrusion member 832 and the second protrusion member 833 may form a groove 834.

The third shielding structure 830 may further include the second structure 835 which is extended from the first structure 831 in the direction (+x axis direction) from the first protrusion member 832 toward the second protrusion member 833. The first structure 831 may be integrally formed with the second structure 835. However, this should not be considered as limiting. For example, the second structure 835 may be formed as a separate member from the first structure 831 and may be bonded or coupled to the first structure 831.

The second structure 835 may include a first area R3 and a second area R4 which is closer to the first structure 831 than the first area R3. A width of the first area R3 may be smaller than a width of the second area R4. For example, the width of the second structure 835 may decrease from the second area R4 toward the first area R3. Referring to FIG. 9C, the width of the second structure 835 may gradually decrease from the second area R4 toward the first area R3.

Referring to FIG. 10, the electronic device 60 according to an embodiment may include the above-described shielding structure 810, 820 or 830. The shielding structure 810, 820 or 830 may be disposed between the camera 610 and the upper end periphery of the electronic device 60 in the housing 600. For example, referring to FIG. 10, the shielding structure 810, 820, or 830 may be disposed in the first opening 510. An electronic device in which the first shielding structure 810 is disposed will be described in detail with reference to FIG. 11. An electronic device in which the second shielding structure 820 is disposed will be described in detail with reference to FIGS. 12 to 14. An electronic device in which the third shielding structure 830 is disposed will be described in detail with reference to FIGS. 15 to 17.

Figure 11:
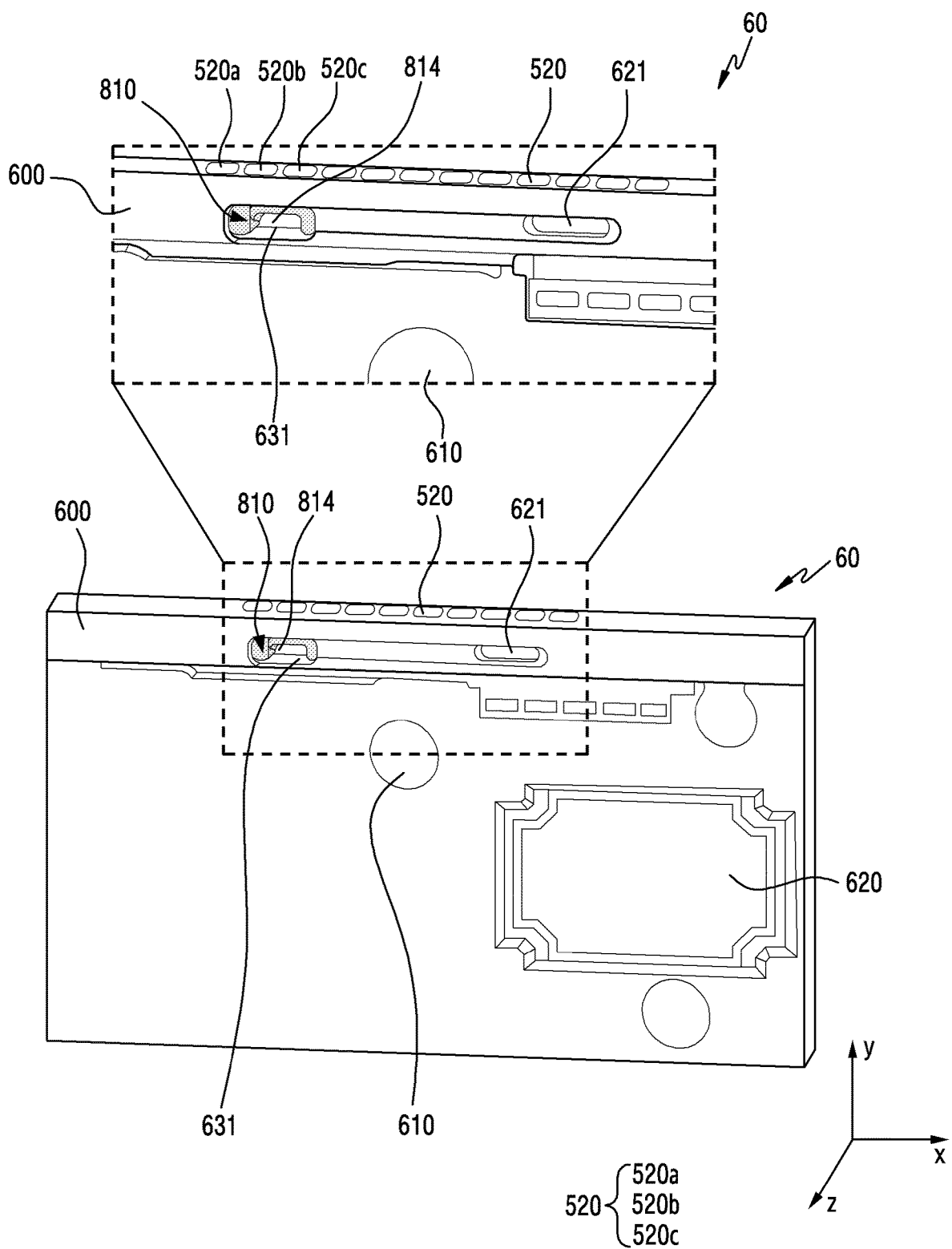
FIG. 11 is a perspective view illustrating an acoustic structure in which a shielding structure is disposed according to an embodiment of the disclosure.

FIG. 11 is a perspective view illustrating an acoustic structure including a first shielding structure according to an embodiment of the disclosure.

Regarding an electronic device 60, reference may be made to the electronic device 60 of FIG. 6. Regarding the first shielding structure 810, reference may be made to the first shielding structure 810 of FIGS. 9A and 10. Redundant explanations of the same components or substantially the same components as those described above will be omitted.

Referring to FIG. 11, the electronic device 60 may include the first shielding structure 810. The first shielding structure 810 may be disposed in the first opening 510. For example, the first shielding structure 810 may be disposed in the receiver sound output hole 631 formed in the first opening 510.

The first shielding structure 810 may include a groove 814. The first shielding structure 810 may be disposed to discharge a sound outputted from a receiver (630 of FIG. 6) to the outside of the electronic device 60 through the groove 814. A sound output from the receiver may be propagated in the electronic device 60 and may be discharged to the outside of the electronic device 60 through the groove 814 of the first shielding structure 810, the receiver sound output hole 631 in sequence.

The first shielding structure 810 may be disposed to shield at least some of the plurality of second openings 520. For example, the first shielding structure 810 may be disposed to shield the second openings 520a, 520b, and 520c that are connected with a path (e.g., the sound output path 632 of FIGS. 8A and 8B) through which a sound outputted from a receiver is propagated among the plurality of second openings 520. Referring to FIG. 9A, the first shielding structure 810 may be disposed such that the first structure 811 shields the second openings 520a, 520b, and 520c. The first shielding structure 810 may shield the second openings 520a, 520b, and 520c to prevent a sound outputted from the receiver from being discharged to the outside of the electronic device 60 through the second openings 520a, 520b, and 520c. Accordingly, the first shielding structure 810 may prevent degradation of acoustic performance of the electronic device 60 which may be caused as a sound outputted from the receiver is discharged through at least some of the plurality of second openings 520.

Figure 12:
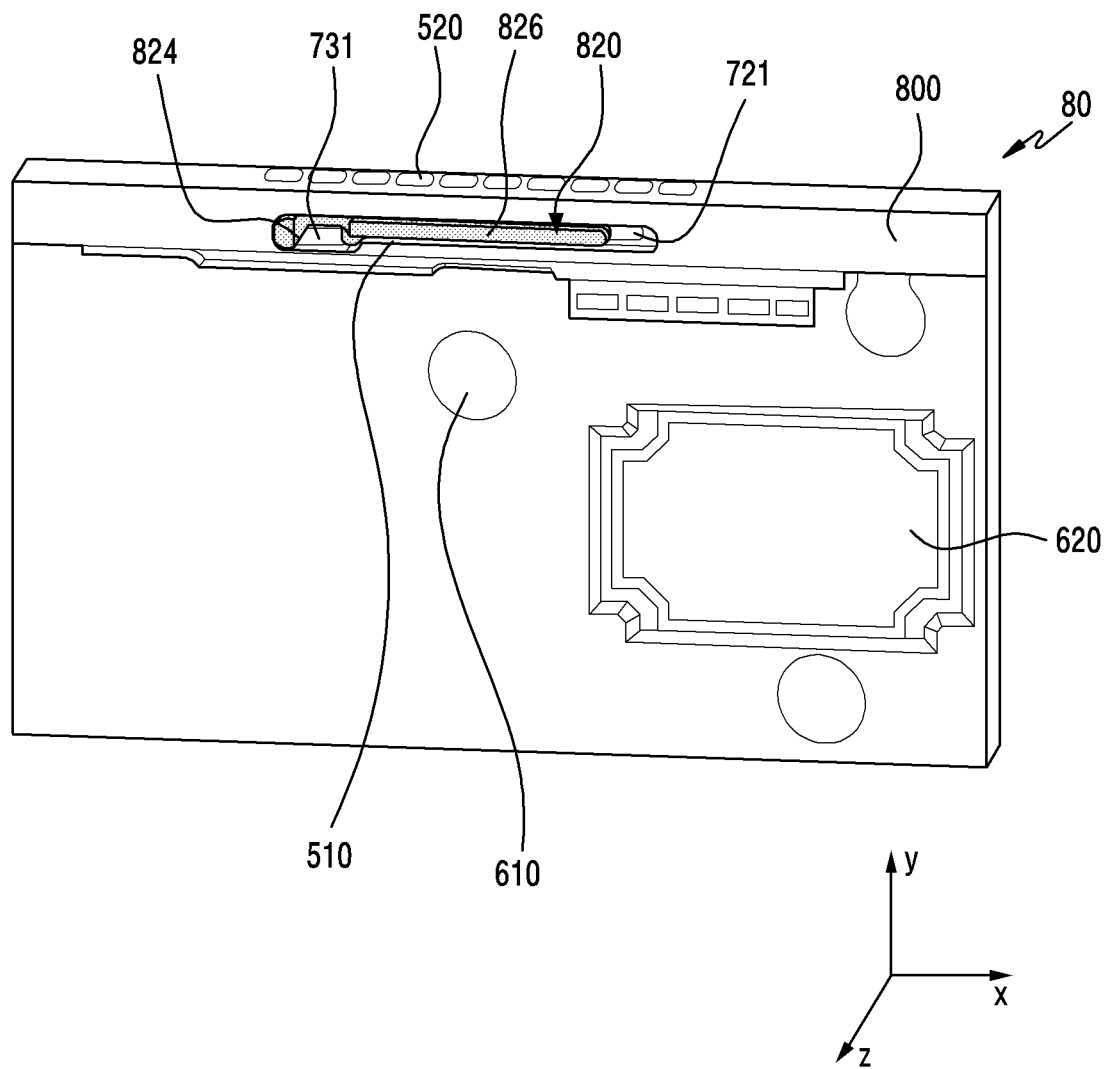
FIG. 12 is a perspective view illustrating an acoustic structure in which a shielding structure is disposed according to an embodiment of the disclosure.

FIG. 12 is a perspective view illustrating an acoustic structure in which a second shielding structure 820 according to an embodiment of the disclosure.

Figure 13:
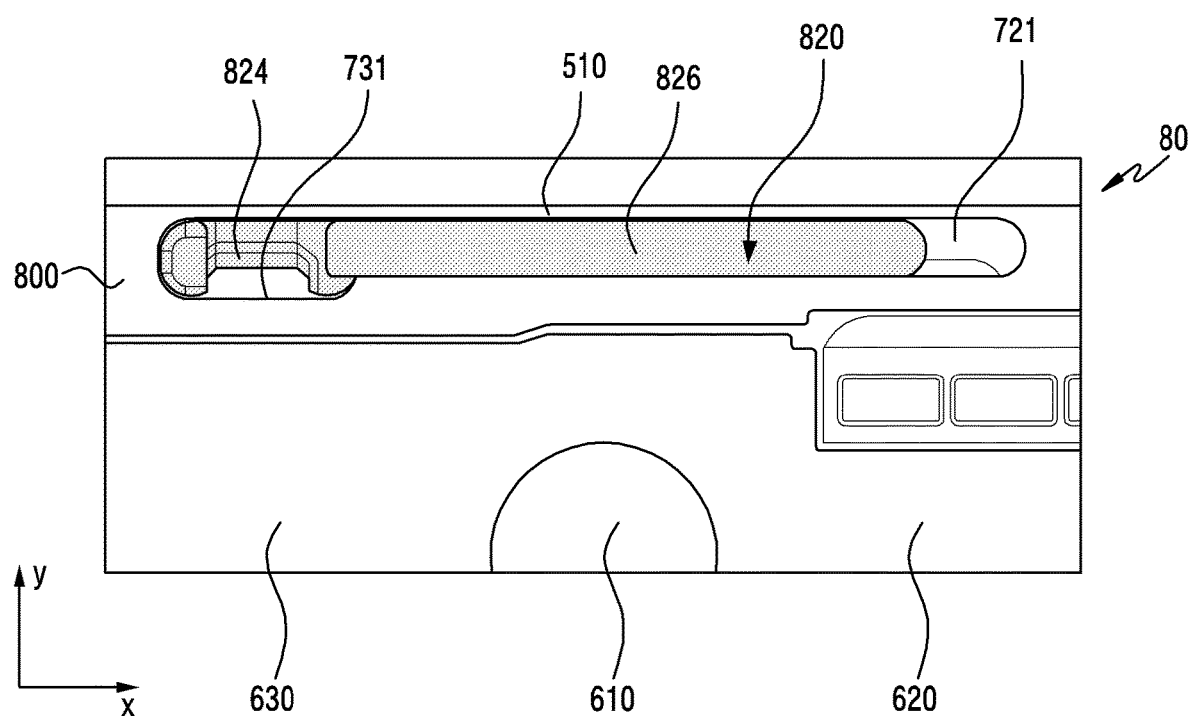
FIG. 13 is a cross-sectional view illustrating the acoustic structure of FIG. 12 according to an embodiment of the disclosure.

FIG. 13 is a cross-sectional view illustrating the acoustic structure of FIG. 12 according to an embodiment of the disclosure.

Figure 14:
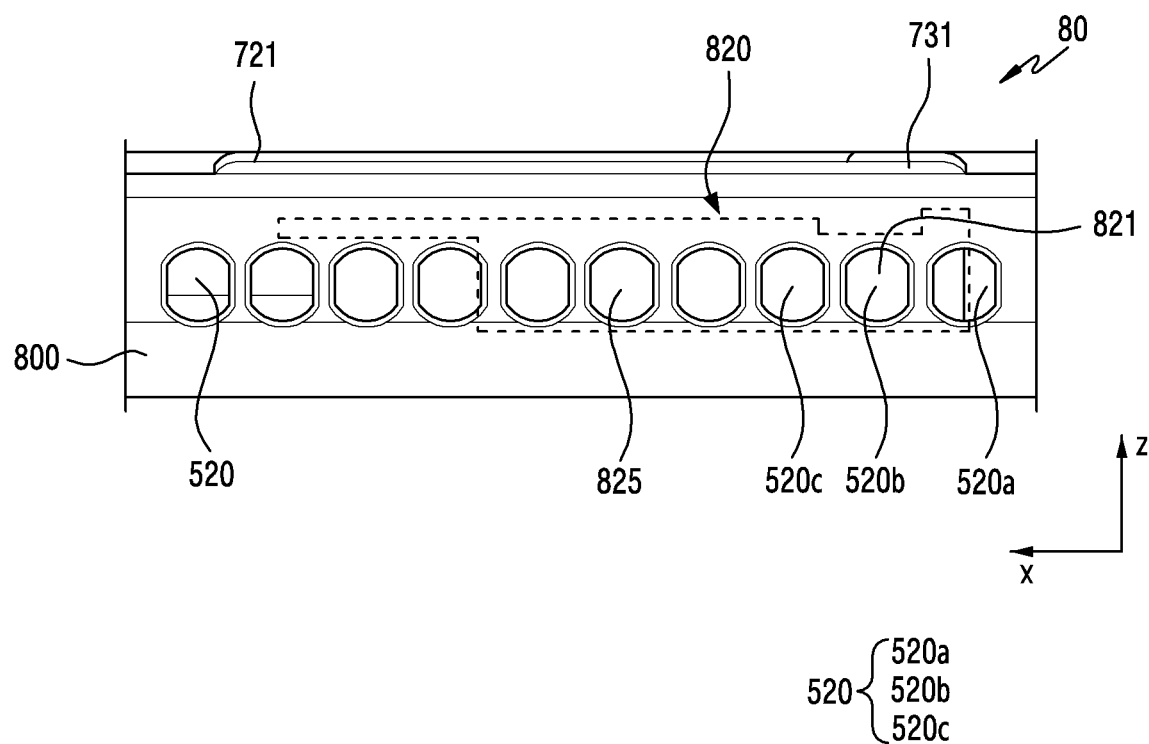
FIG. 14 is a top view illustrating an upper end side surface of the acoustic structure of FIG. 12 according to an embodiment of the disclosure.

FIG. 14 is a top view illustrating an upper end side surface of the acoustic structure of FIG. 12 according to an embodiment of the disclosure.

Regarding an electronic device 80, reference may be made to the electronic device 60 of FIG. 6. Regarding the second shielding structure 820, reference may be made to the second shielding structure 820 of FIGS. 9B and 10. Redundant explanations of the same components or substantially the same components as those described above will be omitted.

Referring to FIG. 12, the electronic device 80 may include the second shielding structure 820. The second shielding structure 820 may be disposed in the first opening 510. Referring to FIG. 9B, a first structure (821 of FIG. 9B) of the second shielding structure 820 may be disposed in a receiver sound output hole 731 formed in the first opening 510.

The second shielding structure 820 may include a groove 824. The second shielding structure 820 may be disposed to discharge a sound outputted from a receiver to the outside of the electronic device 80 through the groove 824. A sound outputted from the receiver may be discharged to the outside of the electronic device 80 through the groove 824 of the second shielding structure 820, the receiver sound output hole 731 in sequence.

Referring to FIGS. 12 and 13, the second shielding structure 820 may be disposed to have a front surface 826 face the front surface of the electronic device 80 (+z axis direction). The front surface 826 of the second shielding structure 820 may shield at least part of the first opening 510. For example, the second shielding structure 820 may be disposed to have the front surface 826 shield at least part of the first opening 510, such that the electronic device 80 may include a sound output hole 721 which is an opening formed by the first opening 510 and the second shielding structure 820. A sound output from the speaker 620 may be discharged to the outside of the electronic device 80 through the sound output hole 721. However, this should not be considered as limiting. For example, the second shielding structure 820 may have the front surface 826 shield at least part of the first opening 510 such that the speaker sound output hole 721 is not formed.

Referring to FIG. 14, the second shielding structure 820 may be disposed to shield at least some of the plurality of second openings 520. For example, the second shielding structure 820 may be disposed to shield the second openings 520a, 520b, and 520c that are connected with a path (e.g., the sound output hole 731) through which a sound output from the receiver is propagated among the plurality of second openings 520. Referring to FIG. 9B, the second shielding structure 820 may be disposed such that the first structure 821 shields the second openings 520a, 520b, 520c. The second shielding structure 820 may shield the second openings 520a, 520b, 520c to prevent a sound output from the receiver from being discharged to the outside of the electronic device 80 through the second openings. The second shielding structure 820 may prevent degradation of acoustic performance of the electronic device 80 which may be caused as a sound outputted from the receiver is discharged through at least some of the plurality of second openings 520.

The second shielding structure 820 may be disposed such that the second structure 825 shields other openings of the plurality of second openings 520. The second structure 825 of the second shielding structure 820 may adjust a pressure or intensity of a sound output from the speaker, discharged from the plurality of second openings 520, by shielding at least part of at least one other openings of the plurality of second openings 520 formed to discharge a sound output from the speaker to the outside of the electronic device 80. For example, an intensity of a sound discharged to a side surface (+y axis direction) of the electronic device 80 may be adjusted by adjusting the number or areas of the plurality of second openings 520 through which a sound outputted from the speaker is discharged.

Figure 15:
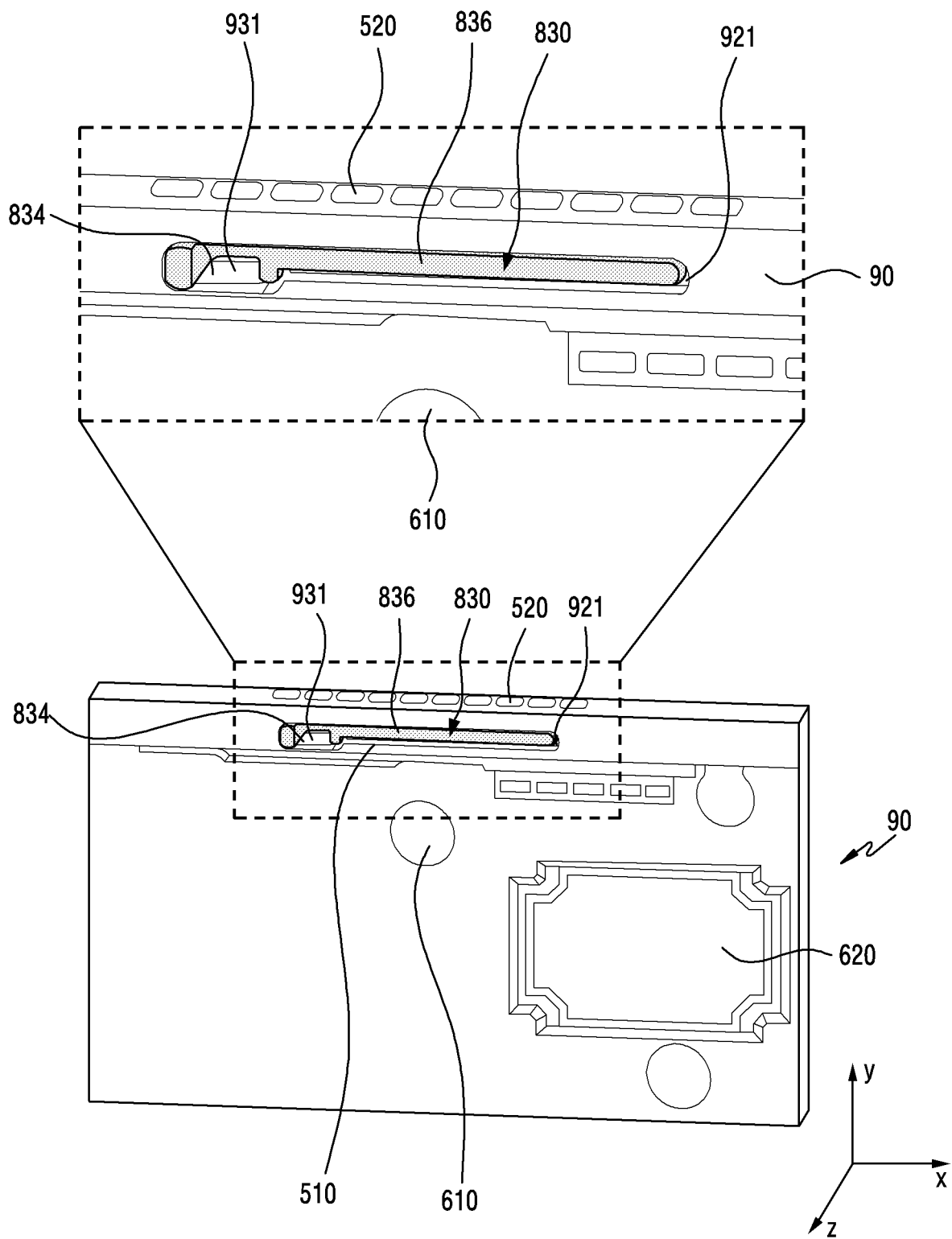
FIG. 15 is a perspective view illustrating an acoustic structure in which a shielding structure is disposed according to an embodiment of the disclosure.

FIG. 15 is a perspective view illustrating an acoustic structure in which a shielding structure according to an embodiment of the disclosure.

Figure 16:
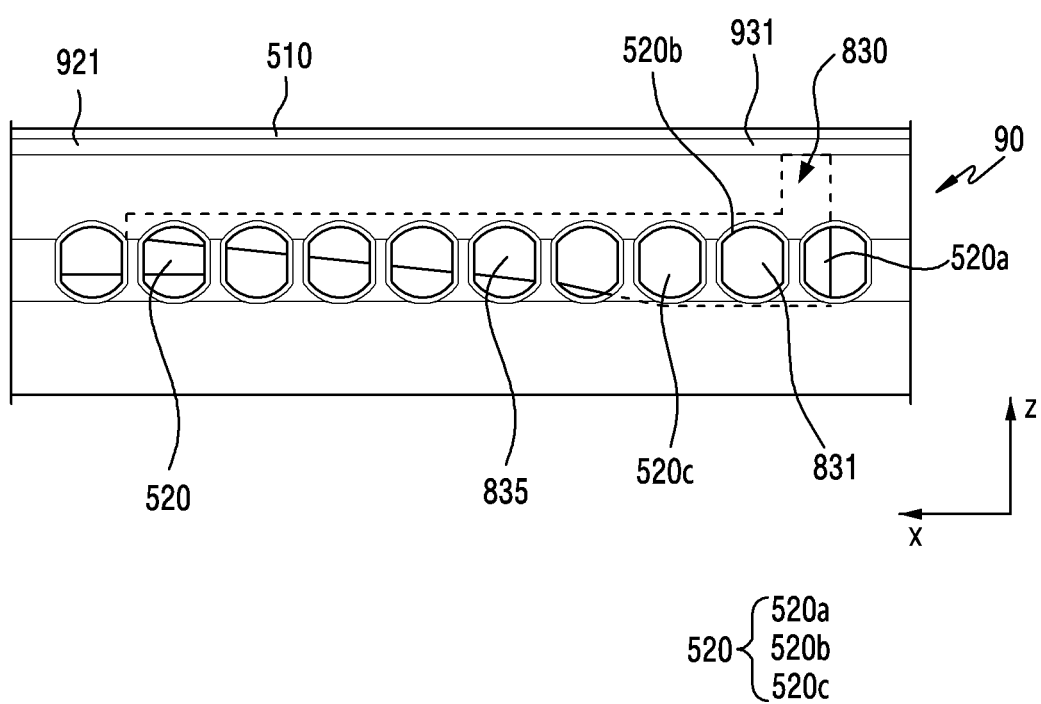
FIG. 16 is a top view illustrating an upper end side surface of the acoustic structure of FIG. 15 according to an embodiment of the disclosure.

FIG. 16 is a top view illustrating an upper end side surface of the acoustic structure of FIG. 15 according to an embodiment of the disclosure.

Figure 17:
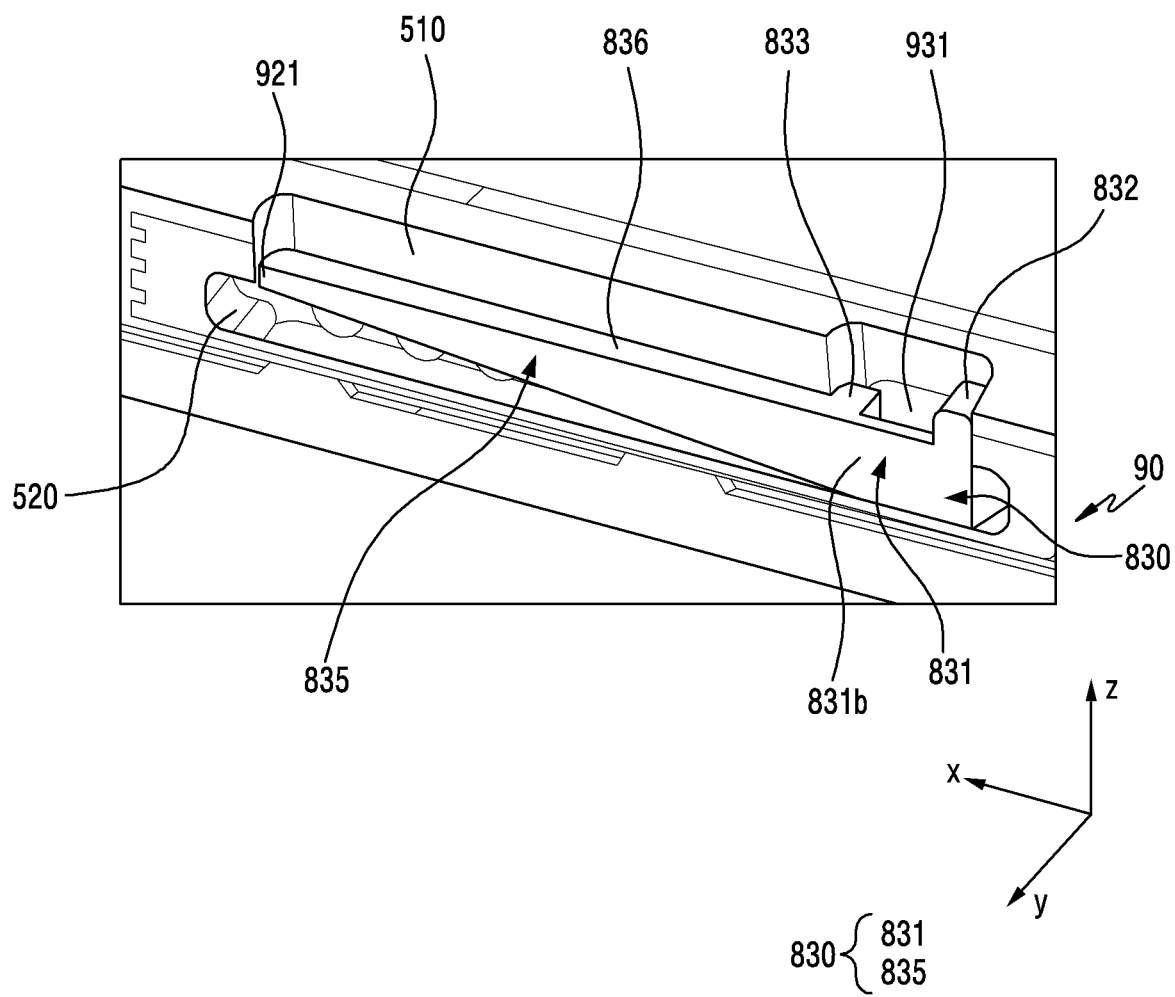
FIG. 17 is a cross-sectional view illustrating an inside of the acoustic structure of FIG. 15 according to an embodiment of the disclosure.

FIG. 17 is a cross-sectional view illustrating an interior of the acoustic structure of FIG. 15 according to an embodiment of the disclosure.

Regarding an electronic device 90, reference may be made to the electronic device 60 of FIG. 6. Regarding a third shielding structure 830, reference may be made to the third shielding structure 830 of FIGS. 9C and 10. Redundant explanations of the same components or substantially the same components as those described above will be omitted.

Referring to FIG. 15, the electronic device 90 may include the third shielding structure 830. The third shielding structure 830 may be disposed in the first opening 510. For example, a first structure (831 of FIG. 9C) of the third shielding structure 830 may be disposed in a receiver sound output hole 931 formed in the first opening 510.

The third shielding structure 830 may include a groove 834. The third shielding structure 830 may be disposed to discharge a sound output from a receiver to the outside of the electronic device 90 through the groove 834. A sound output from the receiver may be propagated in the electronic device 90, and may be discharged to the outside of the electronic device 90 through the groove 834 of the third shielding structure 830, the receiver sound output hole 931 in sequence.

The third shielding structure 830 may be disposed to have a front surface 836 face the front surface of the electronic device 90 (+z axis direction). The front surface 836 of the third shielding structure 830 may shield at least part of the first opening 510. For example, the third shielding structure 830 may be disposed to have the front surface 836 shield at least part of the first opening 510, such that the electronic device 90 may include a speaker sound output hole 921 which is an opening formed by the first opening 510 and the third shielding structure 830. A sound output from the speaker 620 may be discharged to the outside of the electronic device 80 through the sound output hole 921. However, this should not be considered as limiting. For example, the third shielding structure 830 may have the front surface 836 shield at least part of the first opening 510 such that the speaker sound output hole 921 is not formed.

Referring to FIGS. 16 and 17, the third shielding structure 830 may be disposed to shield at least two of the plurality of second openings 520. For example, the third shielding structure 830 may be disposed to shield the second openings 520a, 520b, and 520c that are connected with a space (e.g., the sound output hole 931) in which a sound outputted from the receiver is propagated among the plurality of second openings 520. The third shielding structure 830 may shield a space connecting the receiver sound output hole 931 and the second openings 520a, 520b, 520c. Referring to FIG. 9C, the third shielding structure 830 may be disposed such that the first structure 831 shields the second openings 520a, 520b, 520c. The first structure 831 may shield a space connecting the receiver sound output hole 931 and the second openings 520a, 520b, 520c. The third shielding structure 830 may shield the second openings 520a, 520b, 520c to prevent a sound outputted from the receiver from being discharged to the outside of the electronic device 90 through the second openings. Accordingly, the third shielding structure 830 may prevent degradation of acoustic performance of the electronic device 90 which may be caused as a sound outputted from the receiver is discharged through at least some of the plurality of second openings 520.

The third shielding structure 830 may be disposed such that the second structure 835 shields other openings of the plurality of second openings 520. The second structure 835 of the third shielding structure 830 may adjust a pressure or intensity of a sound output from the speaker, discharged from the plurality of second openings 520, by shielding at least part of at least one other opening of the plurality of second openings 520 formed to discharge a sound output from the speaker to the outside of the electronic device 90. For example, an intensity of a sound discharged to a side surface (+y axis direction) of the electronic device 90 may be adjusted by adjusting the number or areas of the plurality of second openings 520 through which a sound outputted from the speaker is discharged.

The electronic device according to various embodiments of the disclosure may be various types of devices. The electronic device may include, for example, a portable communication device (e.g., a smart phone), a computer device, a portable multimedia device, a portable medical device, a camera, a wearable device, or a home appliance. According to an embodiment of the disclosure, the electronic device is not limited to the above-described devices.

It should be appreciated that various embodiments of the disclosure and the terms used therein are not intended to limit the technological features set forth herein to particular embodiments, and include various changes, equivalents, or alternatives for a corresponding embodiment. As used herein, each of such phrases as "A or B," "at least one of A and B," "at least one of A or B," "A, B, or C," "at least one of A, B, and C," and "at least one of A, B, or C," may include one or all possible combinations of the items enumerated together in a corresponding one of the phrases. As used herein, such terms as "1st" and "2nd," or "first" and "second" may be used to simply distinguish a corresponding component from another, and does not limit the components in other aspect (for example, importance or order). It is to be understood that if an element (for example, a first element) is referred to, with or without the term "operatively" or "communicatively", as "coupled with," "coupled to", "connected with", or "connected to" another element (for example, a second element), it means that the element may be coupled with another element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (for example, an electromagnetic wave), but this term does not differentiate between a case where data is semi-permanently stored in the storage medium and a case where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed (e.g., downloaded or uploaded) online via an application store (e.g., Play Store™), or between two user devices (for example, smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (for example, a module or a program) of the above-described components may include a single entity or multiple entities, and some of the multiple entities may be separately disposed in other components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, according to an embodiment of the disclosure, an electronic device may include: a housing; a camera which is disposed inside the housing, spaced apart from a first periphery by a first length in a first direction that is perpendicular to the first periphery of the electronic device and faces a second periphery of the electronic device; a speaker which is disposed on one side of the camera inside the housing; a receiver which is disposed on the other side of the camera inside the housing; and a structure which is disposed between the first periphery and the camera inside the housing, and the housing may include: a first opening formed on a front surface of the electronic device between the first periphery and the camera; and a plurality of second openings formed on a side surface of the electronic device along the first periphery, and the structure may shield some of the plurality of second opening, such that a first sound outputted from the speaker is discharged through at least one of some other openings of the second openings or the first opening, and a second sound outputted from the receiver is discharged through the first opening.

The structure may include: a first structure configured to shield some of the plurality of second openings; a first protrusion member extended from the first structure in the first direction; and a second protrusion member spaced apart from the first protrusion member and extended from the first structure in the first direction.

The structure may be formed such that at least part of at least one surface of the structure disposed to face in a second direction that faces the front surface of the electronic device protrudes in the second direction.

The structure may further include a second structure extended from the first structure in a third direction from the first protrusion member toward the second protrusion member, and the second structure may shield at least part of some other openings of the plurality of second openings through which the first sound is discharged.

The structure may be formed such that at least part of at least one surface of the structure facing in the second direction protrudes in the second direction.

The second structure may include a first area and a second area which is closer to the first structure than the first area.

A width of the first area of the second structure is smaller than a width of the second area.

A width of the second structure decreases from the second area toward the first area.

The structure may include at least one of a tape or a bond to shield at least part of two of the plurality of second openings.

The housing may be formed with a metal material and the structure may be formed with rubber.

The structure may include at least one of a tape or a bond to shield some other openings of the plurality of second openings.

The housing may include: a sound output path which is a space connecting the first opening and the receiver; and a penetrating hole formed at one end of the sound output path, and the second sound may be discharged to the first opening through the penetrating hole.

The penetrating hole may be disposed adjacent to the camera.

The plurality of second openings may be formed to be symmetric with reference to a center of the first periphery.

The housing may further include a plurality of third openings formed on a side surface of the electronic device along the second periphery.

The plurality of third openings may be formed to be symmetric with reference to a center of the second periphery.

The number of the plurality of second openings may be the same as the number of the plurality of third openings.

The first opening may include a receiver sound output hole which faces the front surface of the electronic device, and the second sound may be discharged to the first opening through the receiver sound output hole.

The first opening may further include a speaker sound output hole which faces the front surface of the electronic device, and the first sound may be discharged to the first opening through the speaker sound output hole.

At least one of the first opening or the plurality of second openings may be formed through CNC processing.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
a camera disposed in the housing, spaced apart from a first periphery by a first length in a first direction perpendicular to the first periphery of the electronic device and facing a second periphery of the electronic device;
a speaker disposed on one side of the camera inside the housing;
a receiver disposed on another side of the camera inside the housing; and
a structure disposed between the first periphery and the camera inside the housing,
wherein the housing comprises:
a first opening formed on a front surface of the electronic device between the first periphery and the camera, and
a plurality of second openings formed on a side surface of the electronic device along the first periphery, and
wherein the structure is configured to shield at least two of the plurality of second openings, such that a first sound output from the speaker is discharged through at least one other openings of the second openings or the first opening, and a second sound output from the receiver is discharged through the first opening.

2. The electronic device of claim 1, wherein the structure comprises:
a first structure configured to shield at least two of the plurality of second openings;
a first protrusion member extended from the first structure in the first direction; and
a second protrusion member spaced apart from the first protrusion member and extended from the first structure in the first direction.

3. The electronic device of claim 2, wherein the structure is formed such that at least part of at least one surface of the structure disposed to face in a second direction that faces the front surface of the electronic device protrudes in the second direction.

4. The electronic device of claim 2,
wherein the structure further comprises a second structure extended from the first structure in a third direction from the first protrusion member toward the second protrusion member, and
wherein the second structure shields at least part of other openings of the plurality of second openings through which the first sound is discharged.

5. The electronic device of claim 4, wherein the structure is formed such that at least part of at least one surface of the structure disposed to face in the second direction that faces the front surface of the electronic device protrudes in the second direction.

6. The electronic device of claim 4, wherein the second structure comprises a first area and a second area closer to the first structure than the first area.

7. The electronic device of claim 6, wherein a width of the first area of the second structure is smaller than a width of the second area.

8. The electronic device of claim 6, wherein a width of the second structure decreases from the second area toward the first area.

9. The electronic device of claim 4, wherein the structure comprises at least one of a tape or a bond to shield at least part of the plurality of second openings.

10. The electronic device of claim 1, wherein the structure comprises at least one of a tape or a bond to shield other openings of the plurality of second openings.

11. The electronic device of claim 1,
wherein the housing comprises a sound output path,
wherein the sound output path includes a space connecting the first opening and the receiver, and a penetrating hole formed at one end of the sound output path, and
wherein the second sound is discharged to the first opening through the penetrating hole.

12. The electronic device of claim 1, wherein the housing further comprises a plurality of third openings formed on a side surface of the electronic device along the second periphery.

13. The electronic device of claim 12, wherein a number of the plurality of second openings is the same as a number of the plurality of third openings.

14. The electronic device of claim 12, wherein the plurality of third openings comprises a plurality of microphone input holes.

15. The electronic device of claim 1,
wherein the first opening comprises a receiver sound output hole facing the front surface of the electronic device, and
wherein the second sound is discharged to the first opening through the receiver sound output hole.

16. The electronic device of claim 15,
wherein the first opening further comprises a speaker sound output hole facing the front surface of the electronic device, and
wherein the first sound is discharged to the first opening through the speaker sound output hole.

17. The electronic device of claim 1, wherein the plurality of second openings are arranged to be symmetrical with respect to a center axis of the electronic device.

18. The electronic device of claim 1, wherein at least one of the first opening or the plurality of second openings are formed through computerized numerical control (CNC) processing.

* * * * *